United States Patent
Naohara et al.

(10) Patent No.: US 12,008,022 B2
(45) Date of Patent: Jun. 11, 2024

(54) DATA PROCESSING METHOD, DATA PROCESSING DEVICE, AND STORAGE MEDIUM

(71) Applicant: SCREEN Holdings Co., Ltd., Kyoto (JP)

(72) Inventors: Hideji Naohara, Kyoto (JP); Takashi Ikeuchi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 32 days.

(21) Appl. No.: 17/138,922

(22) Filed: Dec. 31, 2020

(65) Prior Publication Data

US 2021/0240741 A1    Aug. 5, 2021

(30) Foreign Application Priority Data

Jan. 30, 2020   (JP) ................................. 2020-013778
Jan. 30, 2020   (JP) ................................. 2020-013779

(51) Int. Cl.
*G06F 17/00*    (2019.01)
*G06F 16/28*    (2019.01)
(Continued)

(52) U.S. Cl.
CPC ............. *G06F 16/285* (2019.01); *G06N 5/04* (2013.01); *G06N 20/00* (2019.01)

(58) Field of Classification Search
CPC .. G06F 16/285; G06F 16/24568; G06F 18/24; G06F 18/23; G06N 5/04;
(Continued)

(56) References Cited

U.S. PATENT DOCUMENTS 6,382,895 B1 * 5/2002 Konishi .............. H01L 21/6719
                                                                        414/217
6,611,728 B1    8/2003 Morioka et al.
(Continued)

FOREIGN PATENT DOCUMENTS

CN   106203519    12/2016
CN   110134070     8/2019
(Continued)

OTHER PUBLICATIONS

Jin-yin Chen et al., DGFE-VG: Dynamic Gene Feature Extraction via Visibility Graph. In Proceedings of the third International Conference on Medical and Health Informatics 2019, Association for Computing Machinery, USA, 119-124. <https://doi.org/10.1145/3340037.3340058>, May (Year: 2019).*

*Primary Examiner* — Greta L Robinson
(74) *Attorney, Agent, or Firm* — JCIPRNET

(57) ABSTRACT

A data processing method includes: acquiring time series data; acquiring evaluation values; performing classification; and performing extraction. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of extraction, the time series data corresponding to one of the plurality of classifications is extracted as extracted time series data.

10 Claims, 25 Drawing Sheets

(51) Int. Cl.
*G06N 5/04* (2023.01)
*G06N 20/00* (2019.01)

(58) Field of Classification Search
CPC .... G06N 20/00; G06K 9/6218; G06K 9/6267; G05B 23/0221; G05B 23/0243; G05B 23/0275; G05B 23/243; H01L 21/67276
See application file for complete search history.

(56) References Cited

U.S. PATENT DOCUMENTS

| | | | |
|---|---|---|---|
| 8,538,571 | B2 | 9/2013 | Asai et al. |
| 8,723,869 | B2 | 5/2014 | Kaushal et al. |
| 10,261,496 | B2 | 4/2019 | Tokorozuki et al. |
| 10,565,513 | B2 | 2/2020 | Cantwell |
| 10,613,960 | B2 | 4/2020 | Masuzaki et al. |
| 10,838,394 | B2 | 11/2020 | Kamiguchi et al. |
| 10,921,775 | B2 | 2/2021 | Tokorozuki et al. |
| 10,956,451 | B2 | 3/2021 | Zhou |
| 2008/0208385 | A1 | 8/2008 | Sakamoto et al. |
| 2014/0304196 | A1 | 10/2014 | Kaushal et al. |
| 2016/0148103 | A1* | 5/2016 | Sarrafzadeh ........... G06V 40/25 706/46 |
| 2019/0050515 | A1* | 2/2019 | Su ........................ G01R 31/007 |
| 2019/0108422 | A1* | 4/2019 | Cantwell ................ G06V 10/82 |
| 2019/0242788 | A1 | 8/2019 | Naohara et al. |
| 2019/0242789 | A1* | 8/2019 | Naohara ............. G01M 99/005 |
| 2019/0243593 | A1* | 8/2019 | Naohara ................ G06F 3/0482 |
| 2019/0265674 | A1* | 8/2019 | Olsen ..................... G05B 17/02 |
| 2019/0310927 | A1 | 10/2019 | Masuzaki et al. |
| 2020/0074327 | A1 | 3/2020 | Yamamoto et al. |
| 2020/0151199 | A1* | 5/2020 | Nakamura ........... G06F 16/285 |
| 2020/0210873 | A1 | 7/2020 | Cantwell |
| 2020/0211325 | A1* | 7/2020 | Kaizerman ........ G06Q 30/0185 |

FOREIGN PATENT DOCUMENTS

| | | |
|---|---|---|
| CN | 110134077 | 8/2019 |
| CN | 110134916 | 8/2019 |
| CN | 110637320 | 12/2019 |
| JP | 2006228911 | 8/2006 |
| JP | 2010199177 | 9/2010 |
| JP | 2011082246 | 4/2011 |
| JP | 2012150721 | 8/2012 |
| JP | 2017083985 | 5/2017 |
| JP | 2017151872 | 8/2017 |
| JP | 2017211713 | 11/2017 |
| JP | 2018120533 | 8/2018 |
| JP | 2018139085 | 9/2018 |
| JP | 2019139416 | 8/2019 |
| JP | 2019140193 | 8/2019 |
| KR | 20190072652 | 6/2019 |
| TW | 201250484 | 12/2012 |
| TW | 201823986 | 7/2018 |
| TW | 201915908 | 4/2019 |
| WO | 2019026134 | 2/2019 |

* cited by examiner

| cluster | time series data | cause and countermeasure information |
|---|---|---|
| slow rise cluster | TD6,TD40 | reduction in density of processing liquid/valve re-fastening |
| peak variation cluster | TD20,TD41 | reduction in substrate holding force/suppression of overcurrent |
| low peak cluster | TD80,TD95 | non-uniformity atmosphere /sensor restarting |

FIG. 14

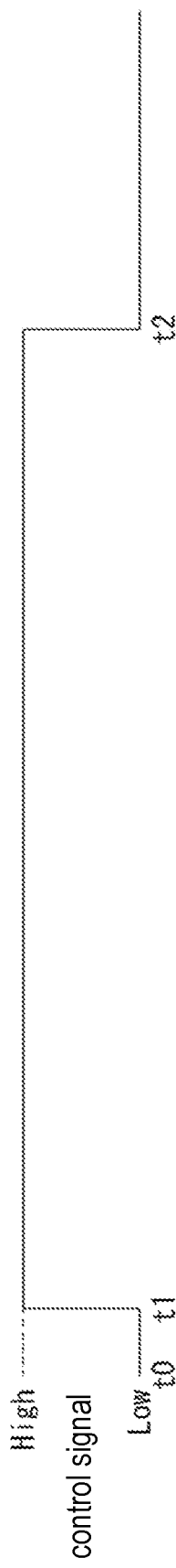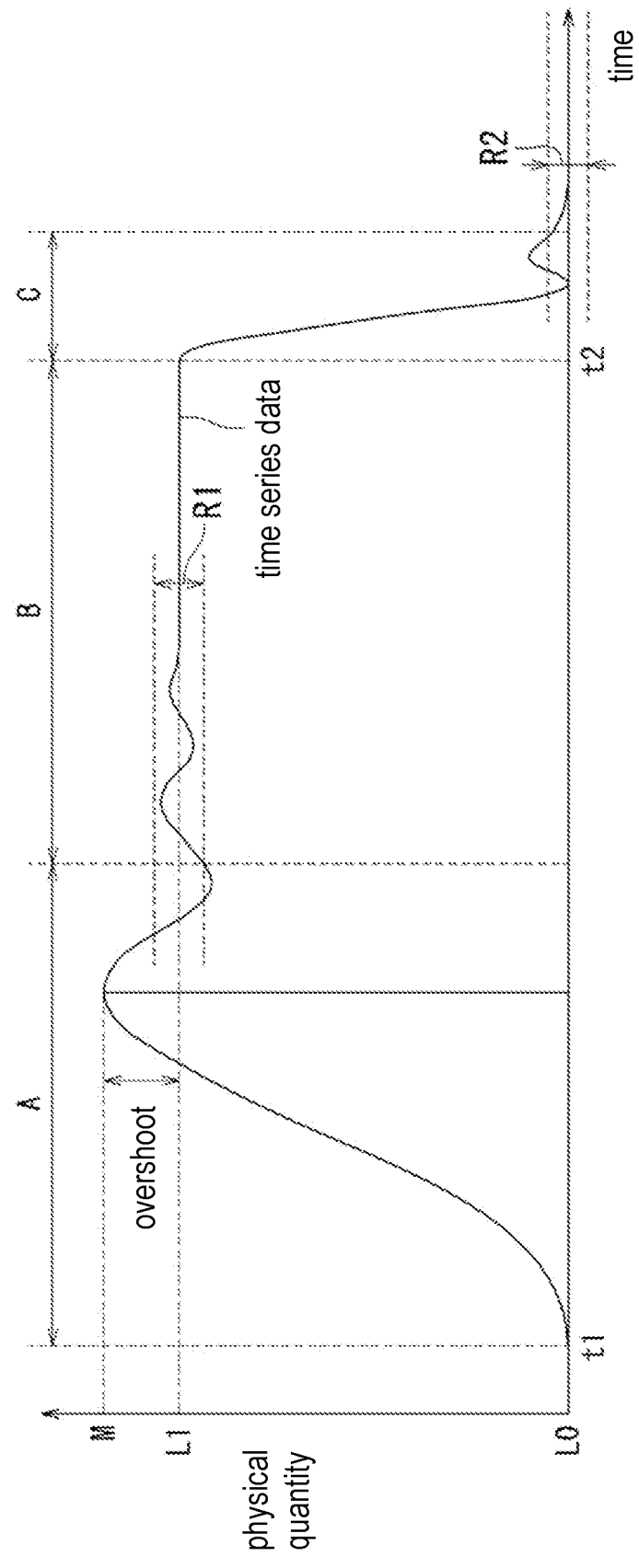

DATA PROCESSING METHOD, DATA PROCESSING DEVICE, AND STORAGE MEDIUM

CROSS-REFERENCE TO RELATED APPLICATION

Priority is claimed on Japanese Patent Application No. 2020-013778, filed Jan. 30, 2020 and Japanese Patent Application No. 2020-013779, filed Jan. 30, 2020 pursuant to U.S.C. 119, the content of which is incorporated herein by reference.

BACKGROUND

Technical Field

The present disclosure relates to a data processing method, a data processing device, and a storage medium.

Description of Related Art

A substrate processing device that processes substrates is known. Typically, a substrate processing device is appropriately used for processing semiconductor substrates. Determining an abnormality of a substrate processing device based on data output in a time series from a substrate processing device has been studied. In a certain semiconductor manufacturing device, a two-axis coordinate system is generated from correlation data with a different monitoring target relating to a specific monitoring target, and an abnormality of the semiconductor manufacturing device is determined based on whether or not it is included in an abnormal area.

SUMMARY

According to one aspect of the present disclosure, there is provided a data processing method including: acquiring time series data; acquiring evaluation values; performing classification; and performing extraction. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of extraction, the time series data corresponding to one of the plurality of classifications is extracted as extracted time series data.

According to another aspect of the present disclosure, there is provided a data processing method including: acquiring time series data; acquiring evaluation values; performing classification; and performing matching. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of matching, target time series data corresponding to one of the plurality of classifications and time series data included in a learning database are matched with each other.

According to another aspect of the present disclosure, there is provided a data processing device including a data acquisition part, an evaluation value acquisition part, a classification part, and an extraction part. The data acquisition part described above is configured to acquire a plurality of time series data acquired by a substrate processing device. The evaluation value acquisition part described above is configured to acquire evaluation values of the plurality of time series data. The classification part described above is configured to classify each of the plurality of time series data into one of a plurality of classifications based on the evaluation value. The extraction part described above is configured to extract the time series data corresponding to one of the plurality of classifications as extracted time series data.

According to yet another aspect of the present disclosure, there is provided a data processing device including a data acquisition part, an evaluation value acquisition part, a classification part, and a matching part. The data acquisition part described above is configured to acquire a plurality of time series data acquired by a substrate processing device. The evaluation value acquisition part described above is configured to acquire evaluation values of the plurality of time series data. The classification part described above is configured to classify each of the plurality of time series data into one of a plurality of classifications based on the evaluation value. The matching part described above is configured to match target time series data corresponding to one of the plurality of classifications and time series data included in a learning database.

According to further another aspect of the present disclosure, there is provided a non-transitory computer-readable storage medium storing a program causing a computer to execute: acquiring time series data; acquiring evaluation values; performing classification; and performing extraction. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of extraction, the time series data corresponding to one of the plurality of classifications is extracted as extracted time series data.

According to yet another aspect of the present disclosure, there is provided a non-transitory computer-readable storage medium storing a program causing a computer to execute: acquiring time series data; acquiring evaluation values; performing classification; and performing matching. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of matching, target time series data corresponding to one of the plurality of classifications and time series data included in a learning database are matched with each other.

BRIEF DESCRIPTION OF THE DRAWINGS

FIG. 14 is a schematic diagram illustrating a table of a learning database of the data processing device according to this embodiment.

FIG. 18A is a diagram illustrating a waveform of a control signal, and FIG. 18B is a diagram illustrating a waveform of time series data.

DESCRIPTION OF THE EMBODIMENTS

Figure 1:
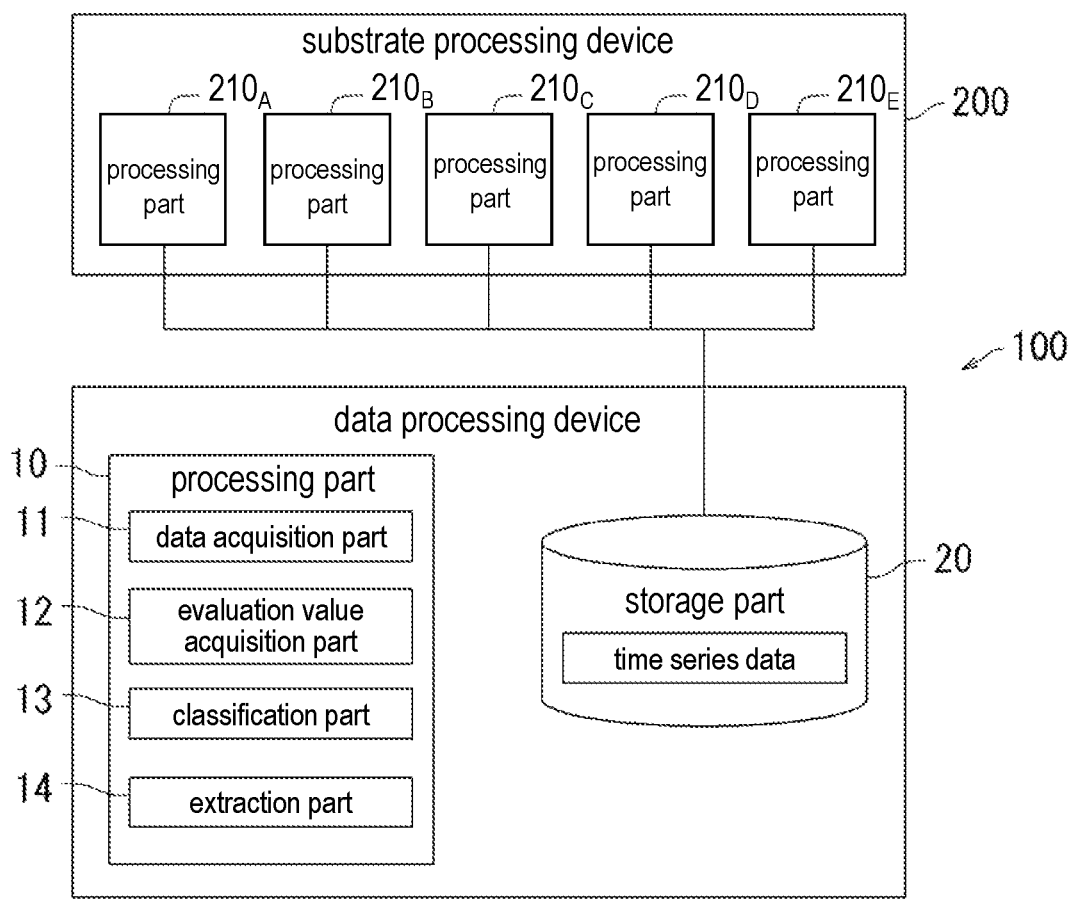
FIG. 1 is a schematic diagram of a data processing device and a substrate processing device according to this embodiment.

Hereinafter, a data processing method, a data processing device, and a storage medium according to this embodiment will be described with reference to the drawings. In the drawings, the same reference signs will be assigned to the same parts or parts corresponding to each other, and description thereof will not be repeated.

First, a data processing device 100 according to this embodiment will be described with reference to FIG. 1. FIG. 1 is a schematic diagram of the data processing device 100 and a substrate processing device 200 according to this embodiment.

The data processing device 100 performs data processing. More specifically, the data processing device 100 processes time series data TD generated by the substrate processing device 200.

Typically, the substrate processing device 200 includes at least one processing part $210_A$, $210_B$, $210_C$, $210_D$ or $210_E$. Each processing part $210_A$, $210_B$, $210_C$, $210_D$ or $210_E$ generates time series data TD.

The time series data TD is data that represents changes of a physical quantity of the substrate processing device 200 with respect to time. The time series data TD represents changes of physical quantity (value) with respect to time that has changed in a time series over a predetermined period. For example, the time series data TD may be data that represents changes of a physical quantity with respect to time for processing performed for a substrate by the substrate processing device 200. Alternatively, the time series data TD may be data representing changes of a physical quantity with respect to time for characteristics of a substrate processed by the substrate processing device 200.

Values represented in the time series data TD may be values that are directly measured by a measuring device. Alternatively, values represented in the time series data TD may be values acquired by performing an arithmetic operation on values directly measured by a measuring device. Alternatively, values represented in the time series data TD may be acquired by performing an arithmetic operation on values measured by a plurality of measuring devices.

Typically, the time series data TD includes 10 or more values. The time series data TD may be composed of 100 or more values or may be composed of 1000 or more values.

The data processing device 100 may be communicatively connected to the substrate processing device 200. Alternatively, the time series data TD generated by the substrate processing device 200 may be transmitted to the data processing device 100 through a memory device.

The data processing device 100 includes a processing part 10. The processing part 10 includes a processor. For example, the processing part 10 includes a central processing part (CPU). Alternatively, the processing part 10 may include a general-purpose arithmetic operation part.

The data processing device 100 may further include a storage part 20. The storage part 20 stores data and a computer program. The storage part 20 includes a main storage device and an auxiliary storage device. For example, the main storage device is a semiconductor memory. For example, the auxiliary storage device is a semiconductor memory and/or a hard disk drive. The storage part 20 may include a removable medium. The processing part 10 executes a computer program stored in the storage part 20.

Here, the computer program is stored in a non-transitory computer-readable storage medium. The non-transitory computer-readable storage medium includes a read only memory (ROM), a random access memory (RAM), a CD-ROM, a magnetic tape, a magnetic disk, and an optical data storage device.

The storage part 20 stores time series data that is generated by the substrate processing device 200. The data processing device 100 and the substrate processing device 200 may be communicatively connected to each other, the time series data TD may be transmitted to the data processing device 100 every time data is generated by the substrate processing device 200, and the storage part 20 may sequentially store the time series data TD. Alternatively, every time a predetermined number of time series data TD are generated by the substrate processing device 200, this time series data TD may be transmitted altogether to the data processing device 100, and the storage part 20 may store the time series data TD altogether.

The processing part 10 includes a data acquisition part 11, an evaluation value acquisition part 12, a classification part 13, and an extraction part 14. The data acquisition part 11 acquires a plurality of time series data. Here, the data acquisition part 11 acquires time series data TD from the storage part 20. In description here, the data acquisition part 11 may be simply referred to as an acquisition part 11.

The evaluation value acquisition part 12 acquires an evaluation value for each of the plurality of time series data TD. In description here, the evaluation value acquisition part 12 may be simply referred to as an acquisition part 12.

The evaluation value acquisition part 12 acquires evaluation values for a plurality of time series data TD in accordance with the same evaluation criterion. The evaluation value acquisition part 12 generates one evaluation value in correspondence with one piece of time series data TD in accordance with a specific evaluation criterion. For example, the evaluation value acquisition part 12 acquires an evaluation value of the entire time series data TD in accordance with the same evaluation criterion. Alternatively, the evaluation value acquisition part 12 acquires an evaluation value of a specific part of the time series data TD in accordance with the same evaluation criterion. In addition, the evaluation value acquisition part 12 may generate an evaluation value by integrating a plurality of evaluation criteria using all or a specific part of the time series data TD.

Typically, the evaluation value acquisition part 12 calculates and generates an evaluation value of the time series data TD in accordance with an evaluation criterion set by the data processing device 100. For example, the evaluation value acquisition part 12 generates an evaluation value by digitizing a waveform of a graph representing the time series data TD. Here, the evaluation value acquisition part 12 may cause another component to calculate an evaluation value and acquire only the calculated evaluation value. The evaluation value may be generated through a comparison between the time series data TD and reference data. The reference data is preferably stored in the storage part 20.

A number that may be taken by an evaluation value is smaller than the number of time series data TD. Typically, when the number of time series data TD is equal to or larger than 100, a number that may be taken by an evaluation value is equal to or larger than 20 and smaller than 100.

An upper limit of the time series data TD is not particularly limited. An upper limit of the number of time series data TD is arbitrary as long as the time series data TD can be calculated or stored by the data processing device 100. For example, the upper limit of the time series data TD may be 10,000, or the upper limit of the time series data TD may be 100 million.

The classification part 13 classifies each of a plurality of time series data TD into one of a plurality of classifications based on an evaluation value. The number of the plurality of classifications is smaller than the number of time series data TD or a number that may be taken by an evaluation value generated in accordance with the time series data TD. Typically, when the number of time series data TD is equal to or larger than 100, and the number that may be taken by an evaluation value is equal to or larger than 20 and smaller than 100, the number of the plurality of classifications is equal to or larger than 2 and equal to or smaller than 10.

An evaluation value of the time series data TD is generated in accordance with a predetermined evaluation criterion. For this reason, classifications acquired by classifying time series data TD using evaluation values may represent levels of the evaluation criterion. In the following description presented below, classifications representing levels of the evaluation criterion may be referred to as levels.

For example, the classification part 13 classifies time series data TD into one of levels 1 to 4 based on an evaluation value. Typically, the acquisition part 12 acquires an evaluation value corresponding to time series data TD based on the time series data TD and the reference data, and then the classification part 13 classifies the time series data TD into one of the levels 1 to 4 based on the evaluation value. The reference data is preferably stored in the storage part 20.

For example, the level 1 represents a classification in which the evaluation value is the reference data or is relatively close to the reference data, and the level 2 represents a classification in which the evaluation value is close to the reference data next after the level 1. The level 3 represents a classification in which the evaluation value is close to the reference data next after the level 2, and the level 4 represents a classification in which the evaluation value is further away from the reference data than all the levels 1 to 3.

The classification part 13 may classify time series data TD into two classifications based on evaluation values. For example, time series data TD classified into a classification 1 may represent reference data being relatively close to the reference data, and time series data TD classified into a classification 2 may represent being further away from the reference data than the classification 1 is.

The extraction part 14 extracts time series data corresponding to one of classifications classified by the classification part 13 as extracted time series data. In accordance with this, specific time series data representing evaluation values in a specific range can be collected from a plurality of time series data as extracted time series data.

For example, it is preferable that the extraction part 14 should extract time series data corresponding to a classification that is the farthest from the reference data among the classifications classified by the classification part 13. In accordance with this, time series data corresponding to an evaluation value far from an ideal value or an average value can be easily extracted. For this reason, the substrate processing device 200 can perceive changes of the substrate processing device 200 before a substantive abnormality occurs. In this case, it is preferable that the control of the substrate processing device 200 should be changed such that a change of the substrate processing device 200 is inhibited before an abnormality occurs in substrate processing of the substrate processing device 200.

As described above, it is preferable that the extraction part 14 should extract time series data corresponding to a classification that is the farthest from the reference data among the classifications classified by the classification part 13. In a case in which time series data representing an evaluation value far from the reference data is extracted as extracted time series data, it is preferable that the extracted time series data should be further processed to be clustered. The extracted time series data extracted by the extraction part 14 may not be time series data corresponding to a classification that is the farthest from the reference data.

According to the data processing device 100 of this embodiment, specific time series data can be easily extracted from a plurality of time series data generated by the substrate processing device.

Figure 2:
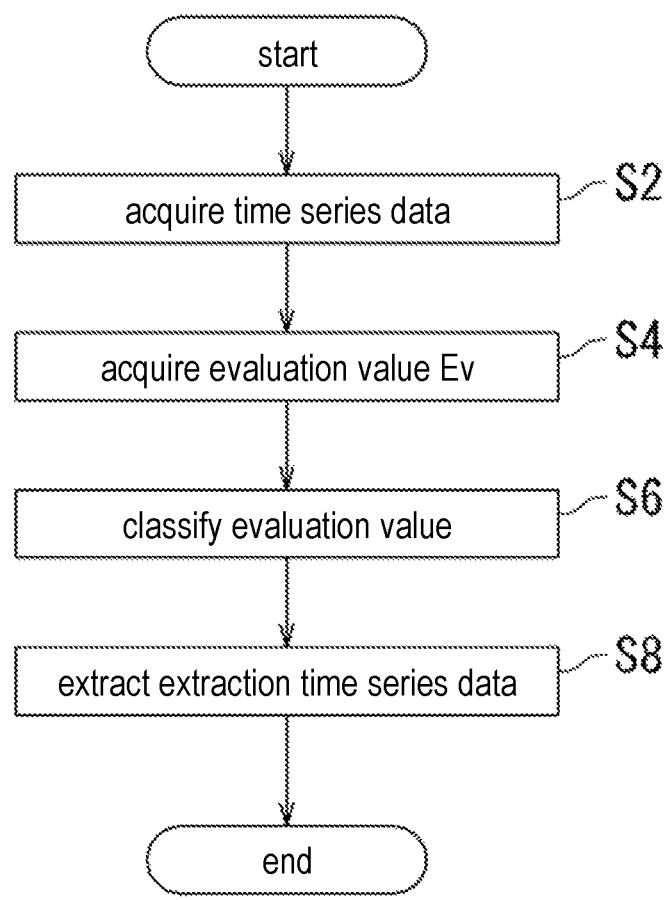
FIG. 2 is a flowchart illustrating a data processing method according to this embodiment.

Next, a data processing method according to this embodiment will be described with reference to FIGS. 1 and 2. FIG. 2 is a flowchart illustrating the data processing method according to this embodiment.

As illustrated in FIG. 2, time series data TD is acquired in Step S2. The time series data TD is data that is generated by the substrate processing device 200. The acquisition part 11 acquires a plurality of time series data TD. The plurality of time series data TD may be data generated by the same processing part $210_A$, $210_B$, $210_C$, $210_D$ or $210_E$ or data generated by different processing parts $210_A$, $210_B$, $210_C$, $210_D$ and $210_E$. Each of the plurality of time series data TD represents a change of a physical quantity in a specific part with respect to time in the substrate processing device 200.

The acquisition part 11 acquires a plurality of time series data TD from the storage part 20. Alternatively, the acquisition part 11 may acquire time series data TD directly from the substrate processing device 200. For example, time series data is sequentially generated in accordance with the substrate processing of the substrate processing device 200 or the control of the substrate processing device 200. Next, the process proceeds to Step S4.

In Step S4, evaluation values (scores) are acquired. The acquisition part 12 acquires evaluation values Ev for a plurality of time series data TD. For example, the acquisition part 12 generates an evaluation value Ev for each of a plurality of time series data TD in accordance with a specific evaluation criterion. The evaluation criterion may be stored inside the data processing device 100 or be stored outside the data processing device 100. One evaluation value Ev is acquired for one piece of time series data TD. Here, the evaluation value Ev may represent a plurality of values in accordance with time series data TD.

In addition, a range between a maximum value and a minimum value of the evaluation value may be determined. For example, evaluation values may be normalized such that a difference between a maximum value and a minimum value of the evaluation value is 1.

The evaluation value is generated in accordance with a specific evaluation criterion. For example, evaluation values may be determined such that an evaluation becomes higher as the evaluation value becomes larger, and an evaluation becomes lower as the evaluation value becomes smaller. Alternatively, evaluation values may be determined such that an evaluation becomes lower as the evaluation value becomes larger, and an evaluation becomes higher as the evaluation value becomes smaller. Alternatively, evaluations values may be determined such that an evaluation becomes higher as the evaluation value becomes closer to a specific value, or evaluations may be determined such that an evaluation becomes higher as the evaluation value becomes further away from a specific value. Next, the process proceeds to Step S6.

In Step S6, each piece of time series data TD is classified into one of a plurality of classifications using the evaluation value Ev. The number of classifications that can be used for the classification is smaller than the number of values that can be represented by the evaluation value Ev. Next, the process proceeds to Step S8.

In Step S8, specific time series data TD classified into a target classification that is a target among a plurality of classifications is extracted from a plurality of time series data TD as extracted time series data. Typically, the extracted time series data is stored in the storage part 20. Here, the extracted time series data may be stored in an external memory device.

Thus, the data processing method according to this embodiment is performed is above. According to the data processing method of this embodiment, specific time series data can be easily extracted from a plurality of time series data generated by the substrate processing device 200. In addition, extracted time series data that has been extracted among the plurality of time series data TD acquired in Step S2 may be stored in the storage part 20, and time series data TD that has not been extracted may be removed without being stored in the storage part 20. In accordance with this, necessary information can be efficiently stored.

An evaluation value of the time series data TD may be generated through a comparison with the reference data. For example, the reference data may be generated based on a plurality of time series data representing good substrate processing results. For example, the reference data is generated by averaging a plurality of time series data representing good substrate processing results. In a case in which the reference data is ideal data or time series data at the time of representing good substrate processing results, the time series data has a higher evaluation when the data is closer to the reference data and has a lower evaluation when the data is further away from the reference data.

Figure 3A:
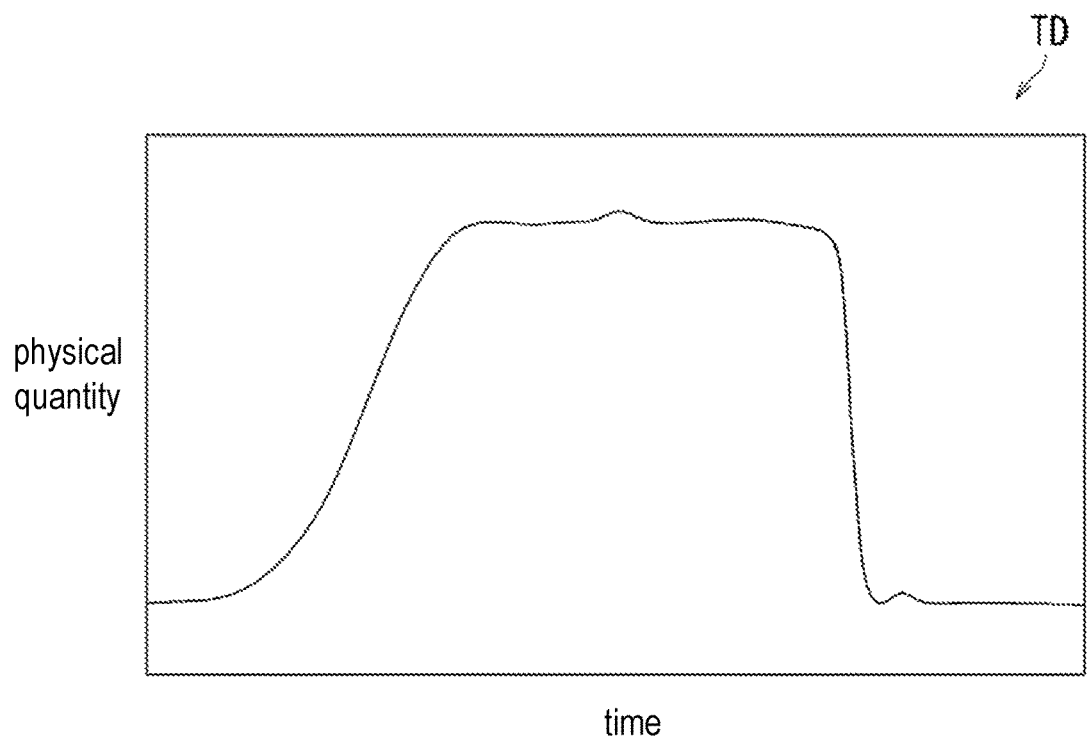
FIG. 3A is a graph representing time series data used in the data processing method according to this embodiment.
Figure 3B:
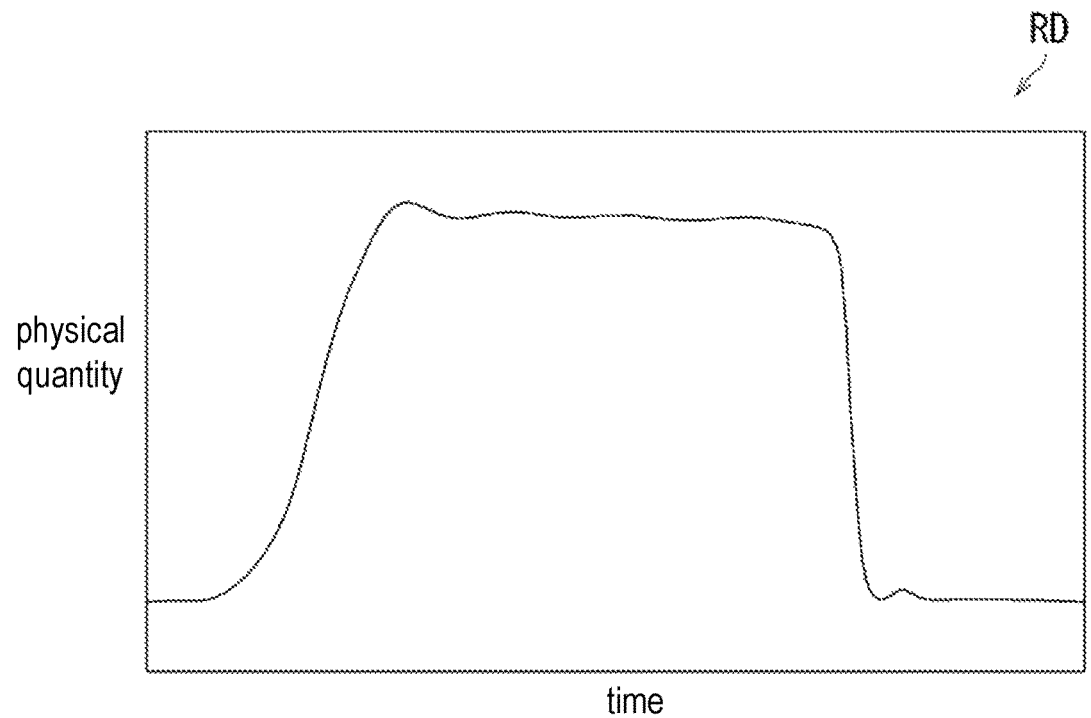
FIG. 3B is a graph representing reference data used in the data processing method according to this embodiment.

Next, the time series data TD and the reference data RD will be described with reference to FIGS. 3A and 3B. FIG. 3A is a graph representing the time series data TD, and FIG. 3B is a graph representing the reference data RD. In the graphs of FIGS. 3A and 3B, the horizontal axis represents time, and the vertical axis represents a physical quantity. For example, each of the time series data TD and the reference data RD represents changes of 100 physical quantities (values) with respect to time.

The time series data TD and the reference data RD represent changes of the same physical quantity with respect to time, and the shape of the graph represented by the time series data TD and the shape of the graph of the reference data RD are generally the same. However, strictly, the time series data TD does not coincide with the reference data RD.

As illustrated in FIG. 3A, in the time series data TD, the physical quantity is almost zero at a start time point. When a predetermined period elapses, the physical quantity starts to increase from zero. The physical quantity rapidly increases in a short period and reaches a peak. Then, a peak is maintained for the physical quantity for a predetermined period. Over the peak period, the physical quantity slightly varies but is almost constant. Thereafter, the physical quantity rapidly decreases in a short period and returns to almost zero.

In FIG. 3B, the reference data RD is generated based on time series data when substrate processing of the substrate processing device 200 progresses in an ideal state. For example, the reference data RD may be time series data when the substrate processing of the substrate processing device 200 progresses in the most ideal state. Alternatively, the reference data RD may represent an average value of time series data over a period in which substrate processing of the substrate processing device 200 progresses in an ideal state.

As illustrated in FIG. 3B, in the reference data, the physical quantity is almost zero at a start time point. When a predetermined time elapses, the physical quantity starts to increase from zero. The physical quantity rapidly increases in a short period and reaches a peak. Then, the peak for the physical quantity is maintained for a predetermined period. Thereafter, the physical quantity rapidly decreases in a short period and returns to almost zero.

In this way, although the graph represented by the time series data TD exhibits the same trend as that of the graph represented by the reference data RD, strictly, the time series data is not the same as the reference data RD. For example, a period of increase until reaching the peak in the graph of the time series data TD is different from a period of increase until reaching of a peak in the graph of the reference data RD. In addition, a peak value in the graph of the time series data TD is different from a peak value in the graph of the reference data RD. Furthermore, a peak in the graph of the time series data TD varies more than that of the graph of the reference data RD.

Figure 4A:
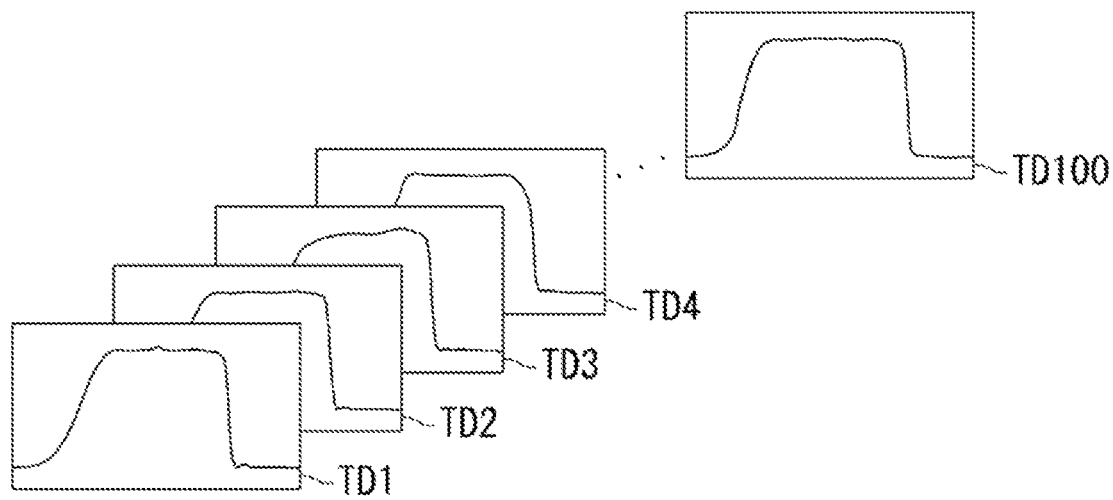
FIG. 4A is a schematic diagram illustrating time series data used in the data processing method according to this embodiment.

Next, a data processing method according to this embodiment will be described with reference to FIGS. 1 to 5B. FIG. 4A is a schematic diagram illustrating time series data TD1 to TD100. Each piece of the time series data TD1 to TD100 represents a change of the same physical quantity with respect to time. For example, the acquisition part 11 acquires the time series data TD1 to TD100 from the storage part 20.

The acquisition part 12 acquires an evaluation value Ev from each piece of the time series data TD1 to TD100. For example, the acquisition part 12 acquires evaluation values Ev1 to Ev100 based on differences between the time series data TD1 to TD100 and reference data RD. For example, the acquisition part 12 generates an evaluation value Ev by adding squares of differences between values of the time series data TD and a value of the reference data RD. In this case, the evaluation value becomes smaller as the time series data is closer to the reference data, and the evaluation value becomes larger as the time series data is further away from the reference data.

Figure 4B:
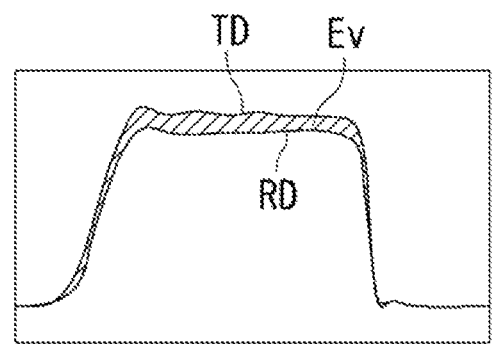
FIG. 4B is a schematic diagram illustrating comparison between time series data and reference data in the data processing method according to this embodiment.

FIG. 4B is a graph illustrating a result of comparison between the time series data TD and the reference data RD. Oblique lines illustrated in FIG. 4B represent a different part between the time series data TD and the reference data RD. In a case in which an evaluation value is acquired by adding squares of differences, the evaluation value Ev corresponds to the area of the oblique line part illustrated in FIG. 4B.

Figure 4C:
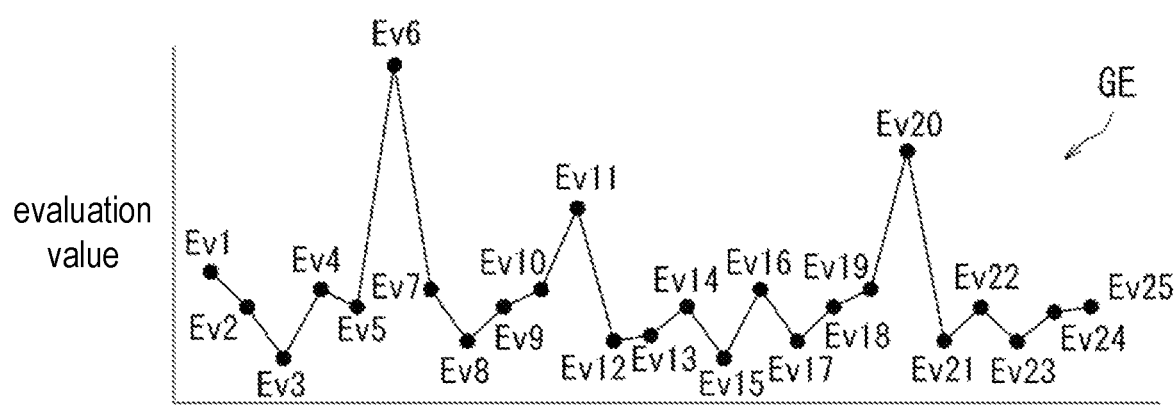
FIG. 4C is a schematic diagram illustrating changes in an evaluation value in the data processing method according to this embodiment.

FIG. 4C is an evaluation value graph GE representing changes of evaluation values Ev1 to Ev25 corresponding to the time series data TD1 to TD25. In FIG. 4C, for the illustration of the drawing, the evaluation value graph GE illustrates changes of the evaluation values Ev1 to Ev25 corresponding to the time series data TD1 to TD25 in time series data TD1 to TD100. As illustrated in FIG. 4C, the evaluation value Ev changes in accordance with the order of the time series data TD. Here, the evaluation value Ev6 is quite high relative to the evaluation values Ev1 to Ev5 and Ev7 to Ev10. In addition, the evaluation value Ev20 is quite high relative to the evaluation values Ev15 to Ev19 and Ev21 to Ev25.

Figure 5A:
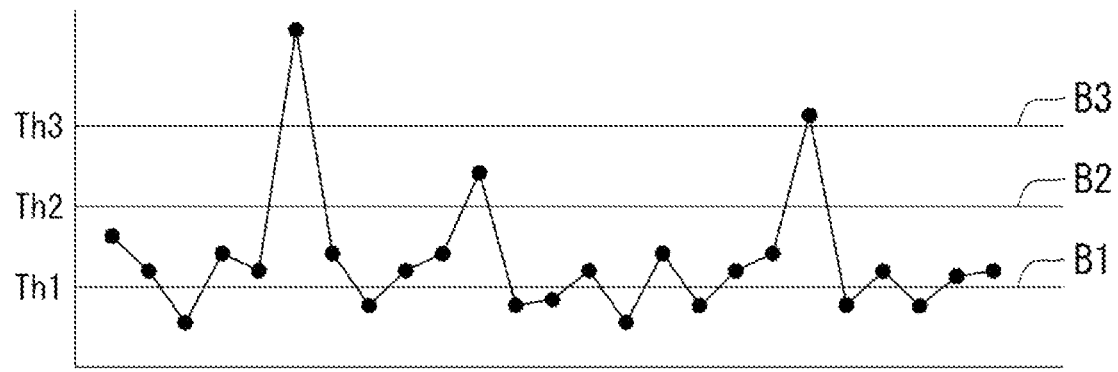
FIG. 5A is a schematic diagram illustrating classifications based on evaluation values in the data processing method according to this embodiment.

FIG. 5A is a graph illustrating classification of an evaluation value graph GE representing changes of evaluation values Ev1 to Ev25. As illustrated in FIG. 5A, the evaluation values Ev are classified in accordance with magnitudes. For example, an evaluation value is classified into one of a plurality of classifications based on magnitudes.

Here, the classification part 13 classifies each piece of the time series data TD1 to TD25 into one of four levels based on evaluation values Ev1 to Ev25. The classification part 13 classifies time series data TD of which the magnitude of the evaluation value Ev does not exceed a threshold Th1 into a level 1. The classification part 13 classifies time series data TD of which the magnitude of the evaluation value Ev is equal to or higher than the threshold Th1 and does not exceed a threshold Th2 into a level 2. The classification part 13 classifies time series data TD of which the magnitude of the evaluation value Ev is equal to or higher than the threshold Th2 and does not exceed Th3 into a level 3. The classification part 13 classifies time series data TD of which the magnitude of the evaluation value Ev is equal to or higher than the predetermined value Th3 into a level 4.

In the graph of FIG. 5A, a boundary line B1 is illustrated at a boundary between the level 1 and the level 2. Similarly, a boundary line B2 is illustrated at a boundary between the level 2 and the level 3, and a boundary line B3 is illustrated at a boundary between the level 3 and the level 4.

In the graph of FIG. 5A, the evaluation values Ev3, Ev8, Ev12, Ev13, Ev15, Ev17, Ev21, and Ev23 correspond to the level 1. The evaluation values Ev1, Ev2, Ev4, Ev5, Ev7, Ev9, Ev10, Ev14, Ev16, Ev18, Ev19, Ev22, Ev24, and Ev25 correspond to the level 2. The evaluation value Ev11 corresponds to the level 3. The evaluation values Ev6 and Ev20 correspond to the level 4.

Figure 5B:
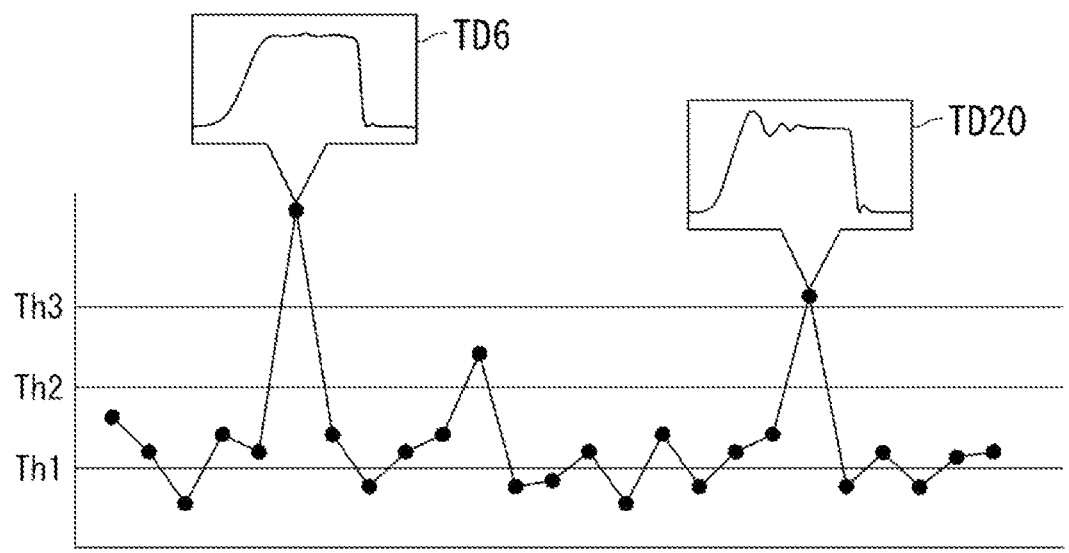
FIG. 5B is a schematic diagram illustrating extraction of time series data in the data processing method according to this embodiment.

FIG. 5B is a graph illustrating extraction of time series data TD6 and time series data TD20 respectively corresponding to the evaluation values Ev6 and Ev20 that is performed by the extraction part 14. As illustrated in FIG. 5B, when evaluation values Ev acquired in accordance with a specific evaluation criterion are compared with each other, the values of the evaluation value Ev6 and the evaluation value Ev20 are larger than the other evaluation values. At this time, the time series data TD6 and the time series data TD20 respectively corresponding to the evaluation value Ev6 and the evaluation value Ev20 are assumed to exhibit an abnormal trend when compared with the other time series data TD. For this reason, the extraction part 14 extracts the time series data TD6 and the time series data TD20 respectively corresponding to the evaluation value Ev6 and the evaluation value Ev20.

According to this embodiment, by using the evaluation values corresponding to a plurality of time series data TD1 to TD100 as references, the time series data TD6 and the time series data TD20 exhibiting an abnormal trend among the plurality of time series data TD1 to TD100 can be appropriately extracted. For this reason, by extracting the time series data TD6 and TD20 classified into a target classification from the plurality of time series data TD1 to TD100, an abnormal state of the substrate processing device 200 can be perceived and reviewed without performing excessive calculation.

In the description presented above (particularly, description with reference to FIGS. 3A to 5B), although time series data TD and reference data RD are compared with each other when an evaluation value Ev is generated, this embodiment is not limited thereto. An evaluation value Ev may be generated from the time series data TD without using the reference data RD.

For example, the acquisition part 12 may generate an evaluation value Ev by comparing a value of a part of the time series data TD with a specific value stored in the storage part 20. For example, a value corresponding to a peak value of the graph of the time series data TD (a value corresponding to a peak value) may be stored in the storage part 20, and the acquisition part 12 may generate an evaluation value Ev by comparing a peak value of the time series data TD with a value corresponding to a peak value stored in the storage part 20.

In addition, a value corresponding to a period of increase of the graph (a value corresponding to a period of increase) of the time series data may be stored in the storage part 20, and the acquisition part 12 may generate an evaluation value Ev by comparing the period of increase of the time series data TD with a value corresponding to the period of increase stored in the storage part 20. Alternatively, a value corresponding to a variation value during a peak period of the graph (a value corresponding to a peak variation) of the time series data may be stored in the storage part 20, and the acquisition part 12 may generate an evaluation value Ev by comparing a peak variation value of the time series data TD with the value corresponding to the peak variation stored in the storage part 20.

In the data processing device 100, it is preferable that an instruction be able to be input from an operator or a supervisor. In the data processing device 100, it is preferable that information should be able to be displayed to an operator or a supervisor. For example, it is particularly preferable that an evaluation value or time series data (particularly, extracted time series data) should be able to be displayed to an operator or a supervisor.

Figure 6:
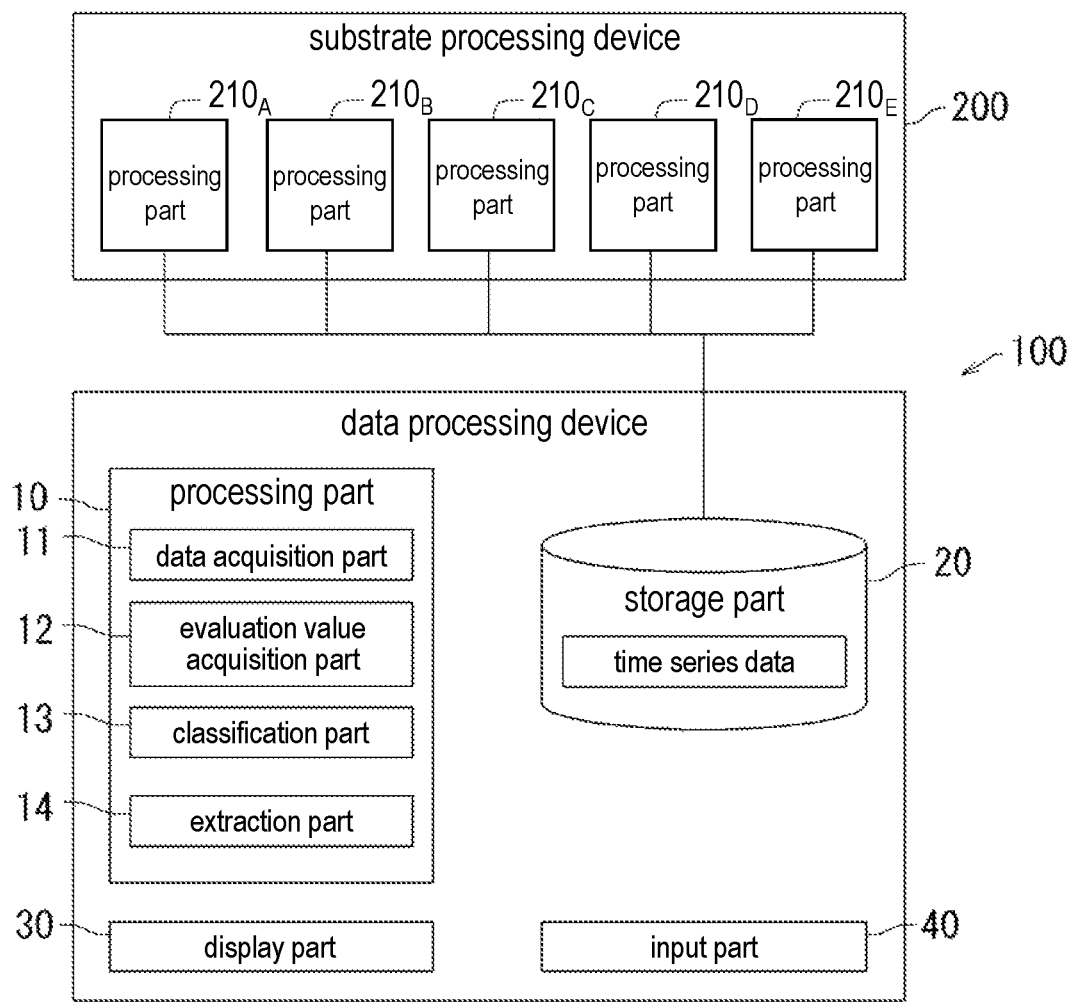
FIG. 6 is a schematic diagram of a data processing device and a substrate processing device according to this embodiment.

Next, a data processing device 100 according to this embodiment will be described with reference to FIG. 6. FIG. 6 is a schematic diagram of the data processing device 100 and the substrate processing device 200. The data processing device 100 illustrated in FIG. 6 has a configuration similar to that of the data processing device 100 described above with reference to FIG. 1 except for further inclusion of a display part 30 and an input part 40. For this reason, duplicate description will be omitted for the purpose of avoiding redundancy.

The display part 30 displays an operation screen or results of various processes. In addition, the display part 30 displays a graph representing time series data or an evaluation value graph GE representing changes of an evaluation value.

The display part 30 includes a display. For example, the display includes a liquid crystal display or an organic EL display.

It is preferable that the display part 30 should display an evaluation value graph GE representing changes of an evaluation value. In a case in which the display part 30 displays an evaluation value graph GE, when an operator or a supervisor designates one value (an evaluation value) of the evaluation value graph GE through the input part 40, it is preferable that the display part 30 should display time series data corresponding to the designated value.

For example, the input part 40 includes various keys used for giving an instruction for a type of operation and details of the operation. The input part 40 includes a keyboard and a mouse. Alternatively, the input part 40 may include a touch sensor. In addition, the display part 30 and the input part 40 may be a touch panel in which both the parts are integrated.

Next, switching of display between an evaluation value graph GE and a graph representing time series data TD that is performed by the display part 30 will be described with reference to FIGS. 4A to 7C.

Figure 7A:
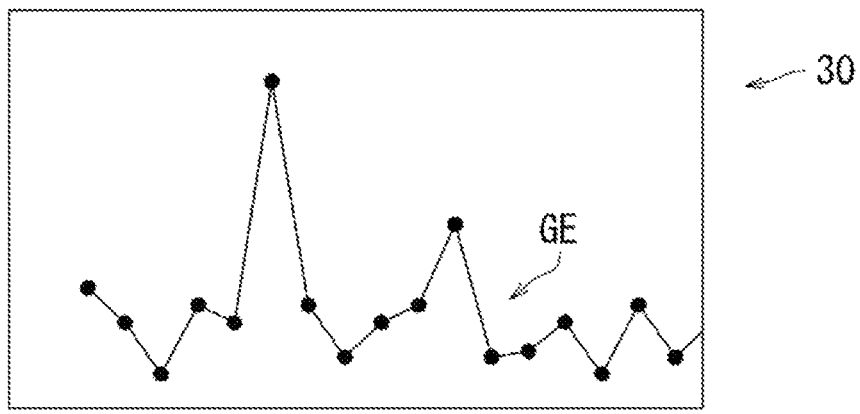
FIGS. 7A to 7C are schematic diagrams illustrating evaluation value graphs and time series data representing changes in evaluation values displayed in a display part of a data processing device according to this embodiment.
Figure 7B:
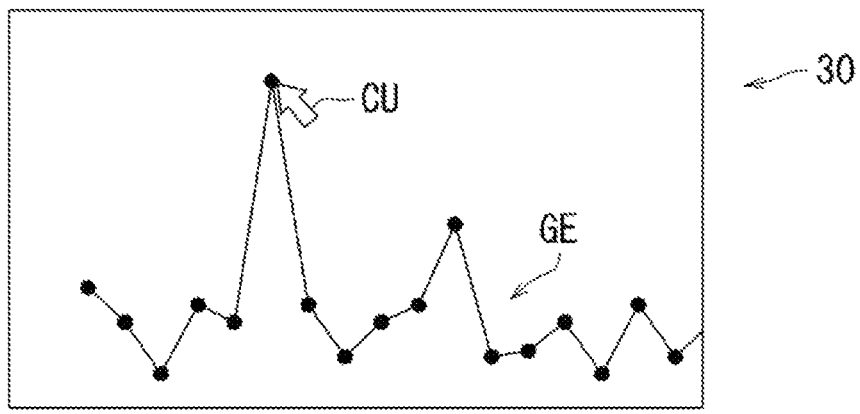

FIGS. 7A and 7B illustrate evaluation value graphs GE displayed by the display part 30. As illustrated in FIG. 7A, the display part 30 displays an evaluation value graph GE representing changes of values of evaluation values Ev1 to Ev100 corresponding to time series data TD1 to TD100. In order to check time series data TD corresponding to an evaluation value Ev, an operator or a supervisor designates time series data TD corresponding to the evaluation value Ev through the input part 40.

As illustrated in FIG. 7B, an operator or a supervisor designates a point representing a specific evaluation value Ev in the evaluation value graph GE by moving a cursor CU to the evaluation value Ev that is a target through the input part 40. Here, the cursor CU designates an evaluation value Ev6. In the case, the display part 30 displays time series data TD6 corresponding to the designated evaluation value Ev6.

Figure 7C:
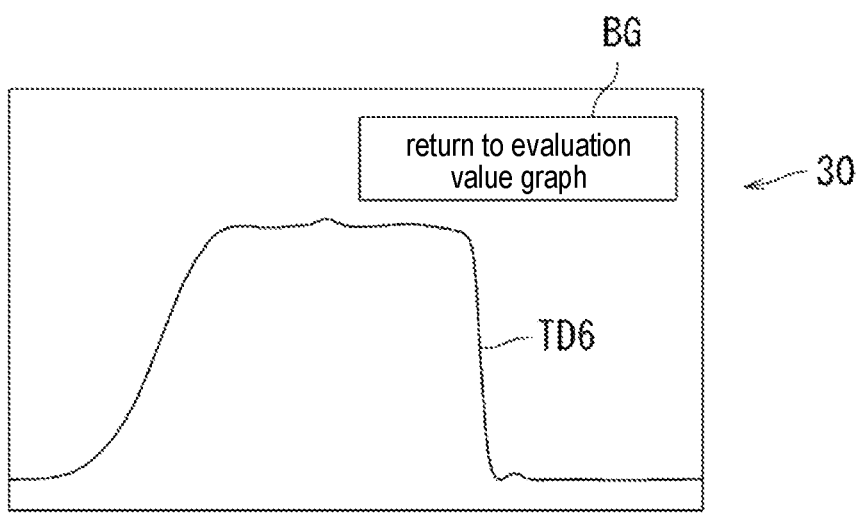

FIG. 7C is a graph representing time series data TD displayed by the display part 30. Here, the display part 30 displays time series data TD6 corresponding to the evaluation value Ev6.

Also in a case in which time series data TD is displayed, it is preferable that the display part 30 should display a button BG for returning to the evaluation value graph GE. When the button BG is selected, the display part 30 is switched to a screen on which the evaluation value graph GE is displayed again. In this way, it is preferable that the display part 30 should display the evaluation value graph GE representing changes of the evaluation value Ev and the graph representing time series data TD with switching therebetween.

Typically, the storage part 20 stores a plurality of time series data. It is preferable that the storage part 20 should store a plurality of time series data in an order in which time series data is generated. In this case, it is preferable that the display part 30 should display a plurality of time series data with switching therebetween in accordance with a predetermined operation.

Figure 8A:
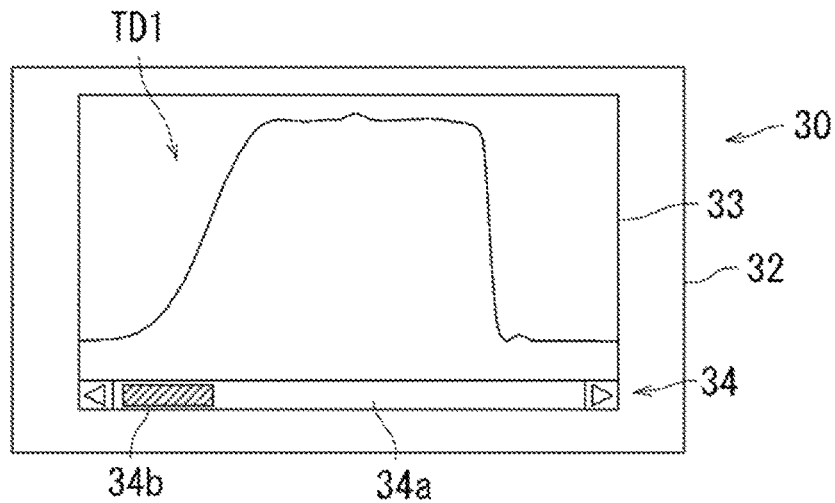
FIGS. 8A to 8C are schematic diagrams illustrating time series data displayed in the display part of the data processing device according to this embodiment.
Figure 8B:
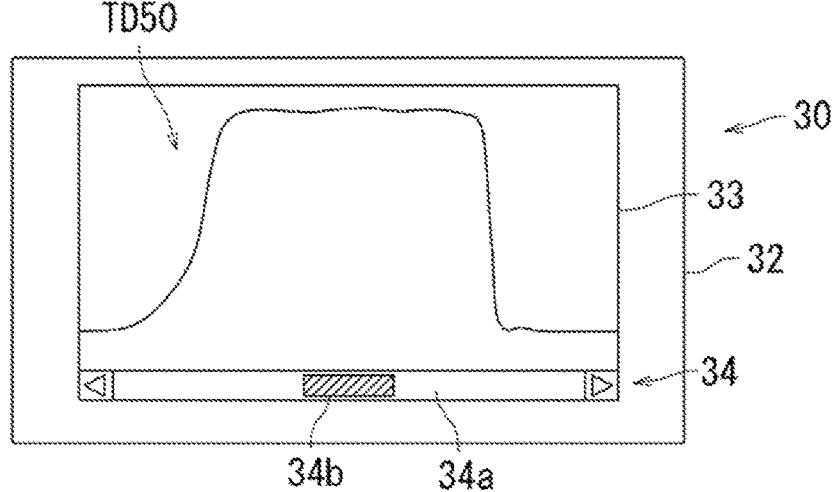
Figure 8C:
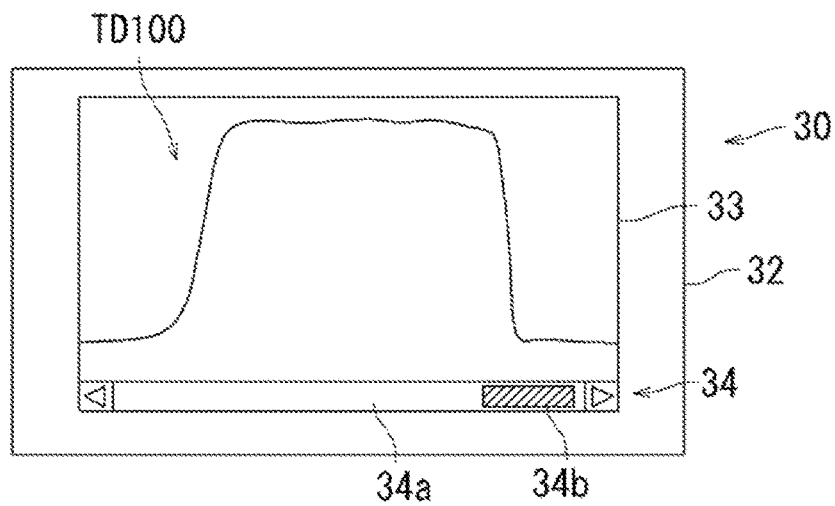

Next, time series data displayed by the display part 30 will be described with reference to FIGS. 1 to 8C. FIGS. 8A to 8C are schematic diagrams illustrating changes in display of a plurality of time series data according to the display part 30. FIGS. 8A to 8C illustrate display screens 32 of the display part 30.

The display screen 32 includes a display area 33 and an operation area 34. The display part 33 displays one piece of time series data. Here, the display area 33 extends in a horizontal direction. A horizontal length of the display area 33 is longer than a vertical length of the display area 33.

Time series data displayed in the display area 33 can be switched in accordance with the operation area 34. Here, the operation area 34 is displayed below the display area 33.

In FIGS. 8A to 8C, the operation area 34 is a scroll bar. The operation area 34 includes an arrow 34a and a knob 34b. The arrow 34a linearly extends in the horizontal direction. The knob 34b is movable along the arrow 34a to overlap with a part inside the arrow 34a. The time series data displayed in the display area 33 is switched in accordance with the position of the knob 34b inside the arrow 34a.

The knob 34b moves in the horizontal direction inside the arrow 34a in accordance with an input from the input part 40. For example, when the knob 34b is moved to the left side or the right side in a state in which the knob 34b is selected, the time series data TD displayed in the display area 33 is switched.

For example, as illustrated in FIG. 8A, in a case in which the knob 34b is positioned at a left end of the arrow 34a, time series data TD1 initially generated is displayed in the display area 33. The knob 34b moves in the horizontal direction inside the arrow 34a in accordance with an input from the input part 40.

As illustrated in FIG. 8B, when the knob 34b is moved to the right side in a state in which the knob 34b is selected, the time series data displayed in the display area 33 is switched. For example, when the knob 34b moves to the center of the arrow 34a, the time series data displayed in the display area 33 is switched to time series data TD50.

As illustrated in FIG. 8C, when the knob 34b is moved further to the right side in a state in which the knob 34b is selected, the time series data displayed in the display area 33 is switched to time series data TD100. As above, the display part 30 can display a plurality of time series data with switching therebetween in accordance with a predetermined operation.

Figure 9A:
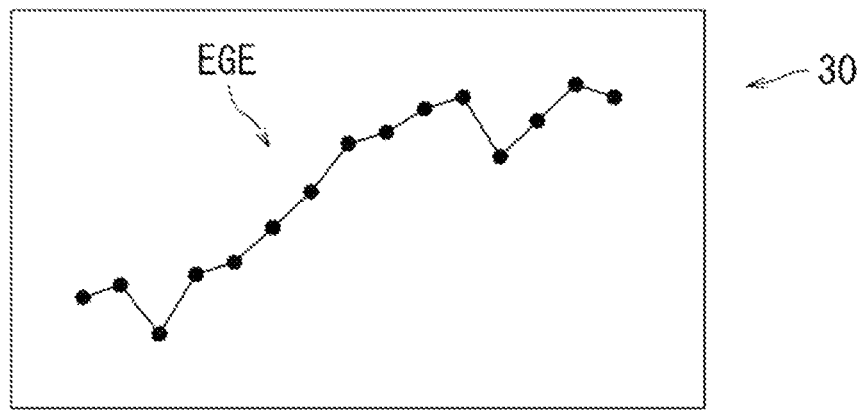
FIGS. 9A to 9C are schematic diagrams illustrating extraction evaluation value graphs and corresponding time series data displayed in the display part of the data processing device according to this embodiment.
Figure 9B:
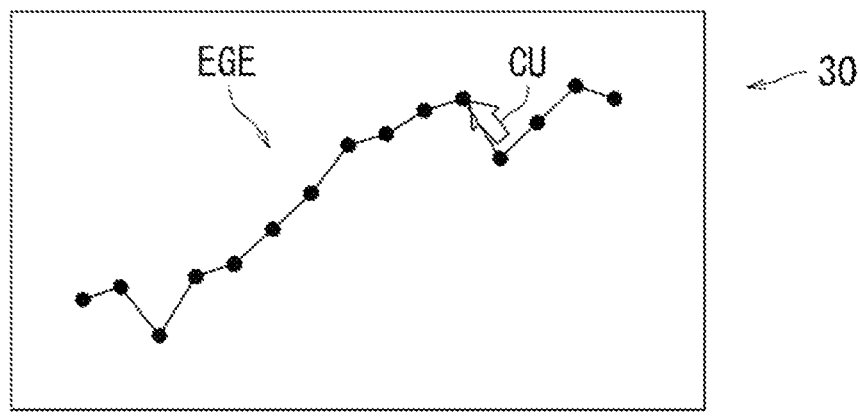

Next, switching of display of a graph representing changes of an evaluation value and time series data that is performed by the display part 30 will be described with reference to FIGS. 9A to 9C. FIGS. 9A and 9B illustrate extraction evaluation value graphs EGE displayed by the display part 30. An extraction evaluation value graph EGE represents changes of an evaluation value corresponding to extracted time series data extracted from a plurality of time series data TD with respect to time. In this case, changes of the evaluation value of the extracted time series data with respect to time can be displayed.

As illustrated in FIG. 9A, the display part 30 displays an extraction evaluation value graph EGE representing changes of an evaluation value Ev corresponding to the extracted time series data. In order to check extracted time series data corresponding to an evaluation value Ev, an operator or a supervisor designates time series data corresponding to the evaluation value Ev through the input part 40.

As illustrated in FIG. 9B, an operator or a supervisor designates a specific evaluation value Ev by moving the cursor CU to the evaluation value Ev that is a target. Here, the cursor CU designates the evaluation value Ev. In the case, the display part 30 displays extracted time series data corresponding to the designated evaluation value Ev.

Figure 9C:
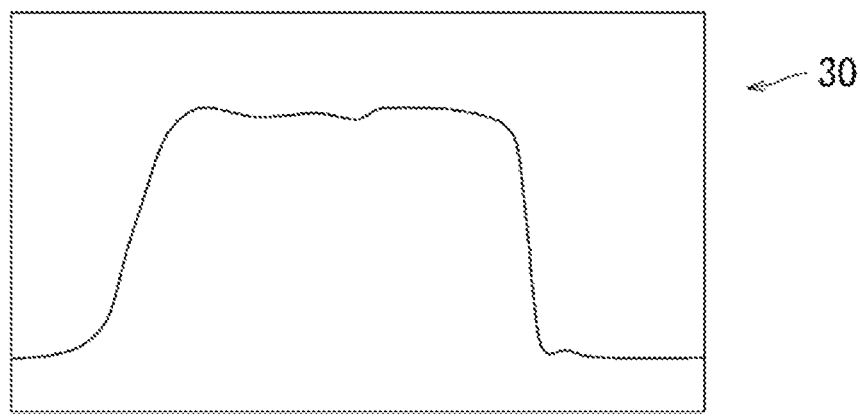

FIG. 9C is a graph that represents extracted time series data displayed by the display part 30. In this way, it is preferable that the display part 30 should display a graph representing changes of the evaluation value Ev and an extraction evaluation value graph EGE representing extracted time series data with switching therebetween. In this way, changes of the evaluation value with respect to time for the extracted time series data can be displayed.

In the description presented above with reference to FIGS. 1 to 9C, although the extracted time series data is extracted, it is preferable to process the extracted time series data. For example, it is preferable to perform clustering processing on the extracted time series data.

Figure 10:
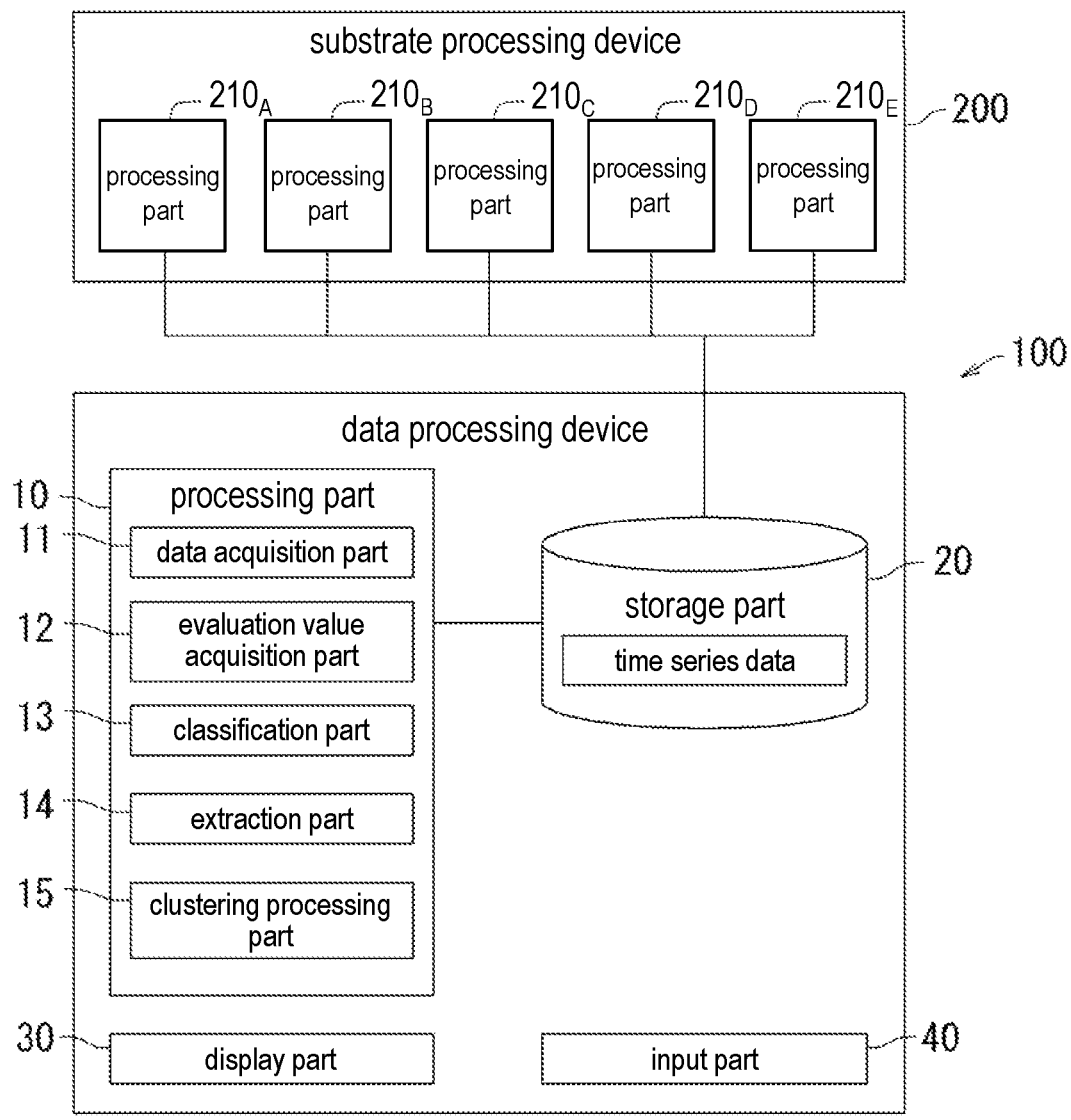
FIG. 10 is a schematic diagram of a data processing device and a substrate processing device according to this embodiment.

Next, a data processing device 100 according to this embodiment will be described with reference to FIG. 10. FIG. 10 is a schematic diagram of the data processing device 100 and the substrate processing device 200. The data processing device 100 illustrated in FIG. 10 has a configuration similar to that of the data processing device 100 described above with reference to FIG. 6 except for further inclusion of a clustering processing part 15. For this reason, duplicate description will be omitted for the purpose of avoiding redundancy.

The data processing device 100 further includes the clustering processing part 15. The clustering processing part 15 is included in the processing part 10.

The clustering processing part 15 performs clustering processing on extracted time series data. For example, the clustering processing part 15 classifies extracted time series data into one of a plurality of clusters in accordance with characteristics of the extracted time series data. For example, the clustering processing part 15 classifies extracted time series data into one of a plurality of clusters in accordance with characteristics of a graph represented in the extracted time series data.

It is preferable that the clustering processing part 15 should perform clustering processing on extracted time series data through so-called unsupervised learning. For example, the clustering processing part 15 may perform clustering processing using all the values of the extracted time series data. For example, the clustering processing part 15 may perform clustering processing using one of hierarchical clustering, k average method clustering, mixed Gaussian model clustering, self-organized mapping clustering, and hidden Markov model clustering.

For example, the plurality of clusters include a slow rise cluster in which a rise in the graph is slow, a peak variation cluster in which there is a large variation of a peak in the graph, and a low peak cluster in which a peak value in the graph is low. In this case, the clustering processing part 15 performs clustering processing such that extracted time series data is classified into at least one of a slow rise cluster, a peak variation cluster, and a low peak cluster. In addition, the plurality of clusters may further include other clusters. For example, the plurality of clusters may include a slow fall cluster in which a fall in the graph is slow.

The clustering processing part 15 may perform clustering processing using all the values of the extracted time series data. For example, the clustering processing part 15 may process all the values of the extracted time series data through vector analysis. Alternatively, the clustering processing part 15 may perform clustering processing using some of the values of the extracted time series data.

Figure 11A:
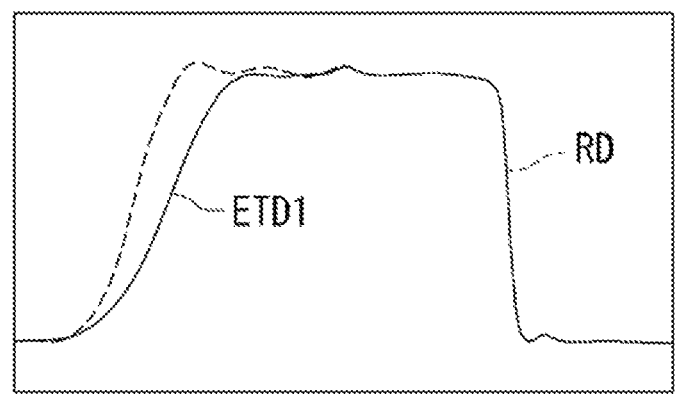
FIGS. 11A to 11C are schematic diagrams illustrating time series data extracted in the data processing method according to this embodiment.
Figure 11B:
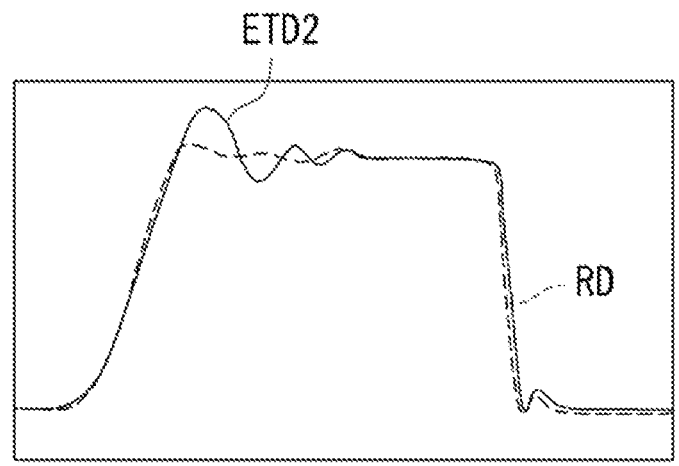
Figure 11C:
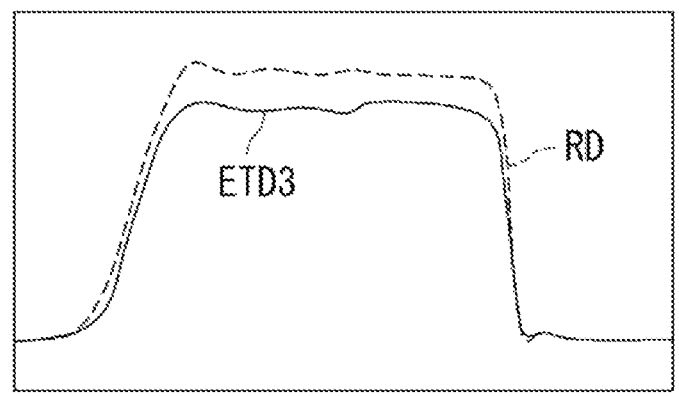

Next, clusters acquired by performing clustering processing on extracted time series data will be described with reference to FIGS. 11A to 11C. FIG. 11A is a graph representing extracted time series data ETD1 classified into a slow rise cluster, FIG. 11B is a graph representing extracted time series data ETD2 classified into a peak variation cluster, and FIG. 11C is a graph representing extracted time series data ETD3 classified into the low peak cluster. Each of FIGS. 11A to 11C represents reference data RD together with the extracted time series data.

As illustrated in FIG. 11A, in a case in which the extracted time series data and the reference data are compared with each other, a rise of the graph of the extracted time series data ETD1 is delayed with respect to the graph of the reference data RD. Such extracted time series data is classified as the slow rise cluster.

As illustrated in FIG. 11B, in a case in which the extracted time series data and the reference data are compared with each other, a peak of the graph of the extracted time series data ETD2 greatly varies relative to the graph of the reference data RD. Such extracted time series data is classified as the peak variation cluster.

As illustrated in FIG. 11C, in a case in which the extracted time series data and the reference data are compared with each other, a peak of the graph of the extracted time series data ETD3 is low relative to the reference data RD. Such extracted time series data is classified as the low peak cluster.

Although the clusters into which the extracted time series data is classified have been described with reference to FIGS. 11A to 11C as an example, in this embodiment, clusters into which the extracted time series data is classified are not limited thereto. The extracted time series data may be classified into other clusters.

Figure 12:
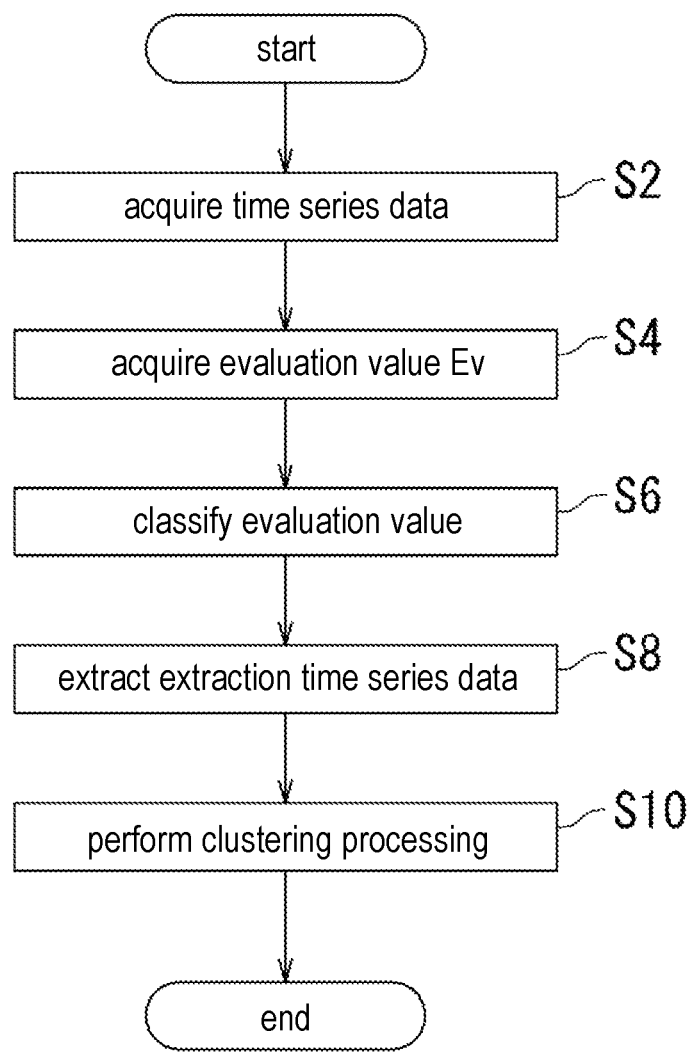
FIG. 12 is a flowchart of a data processing method according to this embodiment.

Next, a data processing method according to this embodiment will be described with reference to FIGS. 1 to 12. FIG. 12 is a flowchart of a data processing method according to this embodiment. The flowchart illustrated in FIG. 12 is similar to the flowchart described above with reference to FIG. 2 except for addition of clustering processing of Step S10. For this reason, duplicate description will be omitted for the purpose of avoiding redundancy.

As illustrated in FIG. 12, in Step S8, extracted time series data is extracted. The extraction part 14 extracts extracted time series data from a plurality of time series data based on results of classification of evaluation values. Next, the process proceeds to Step S10.

In Step S10, clustering processing is performed on the extracted time series data. The clustering processing part 15 classifies the extracted time series data into one of a plurality of clusters.

In the way described above, the data processing method according to this embodiment is performed. According to the data processing method of this embodiment, extracted time series data representing abnormal evaluation values can be classified from a plurality of time series data for each cluster.

Generally, in a case in which clustering processing is performed for all the time series data, normal time series data is also included in the time series data, and thus, a cluster that is not abnormal may be unnecessarily formed, and thus there is concern that an abnormal state of a substrate processing device may not be able to be sufficiently perceived. In contrast to this, according to the data processing method of this embodiment, clustering processing may be performed for extracted time series data representing abnormal evaluation values from among a plurality of time series data, and thus, abnormal states of the substrate processing device 200 can be classified into clusters more accurately. In addition, according to the data processing method of this embodiment, clustering processing is not performed on all the time series data, and thus unnecessary calculation can be avoided.

In addition, it is preferable that the display part 30 should display an evaluation value graph representing changes of a corresponding evaluation value for each cluster. In such a case, when an operator or a supervisor designates one evaluation value of the graph, it is preferable that the display part 30 should display time series data corresponding to the designated evaluation value.

For example, in the description presented above with reference to FIGS. 9A to 9C, although the display part 30 displays an extraction evaluation value graph EGE representing changes of an evaluation value with respect to time for extracted time series data extracted by the extraction part 14, this embodiment is not limited thereto. The display part 30 may display a graph representing changes of an evaluation value with respect to time for time series data classified into clusters by the clustering processing part 15. In such a case, changes of an evaluation value within a specific cluster with respect to time can be displayed.

As described above with reference to FIGS. 10 to 12, it is preferable that clustering processing should be performed for extracted time series data. Apparently, the extracted time series data reflects an abnormal state of the substrate processing device 200, and a result of clustering processing represents a state of the substrate processing device 200 in accordance with a type of abnormal state of the substrate processing device 200. Thus, it is preferable that results of the clustering processing be used for learning the state of the substrate processing device 200.

Figure 13:
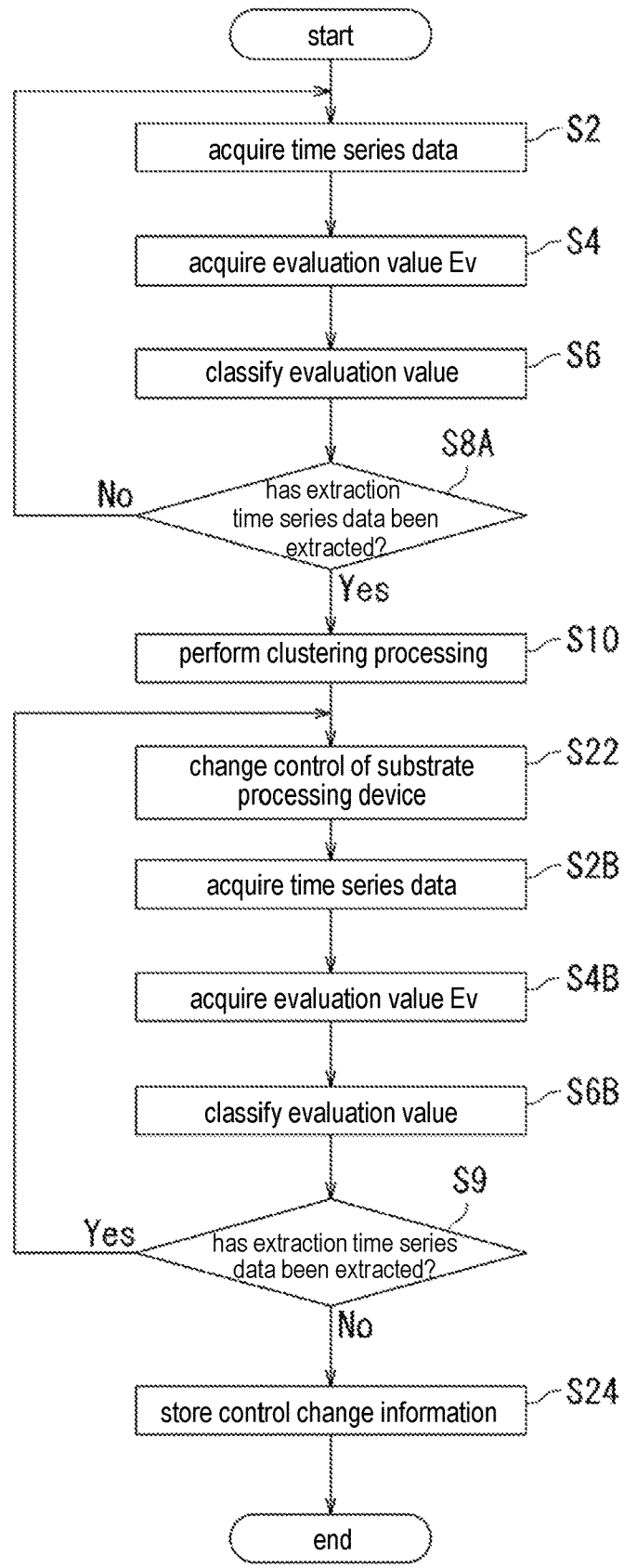
FIG. 13 is a flowchart of the data processing method according to this embodiment.

Next, a data processing method according to this embodiment will be described with reference to FIGS. 1 to 13. FIG. 13 is a flowchart of the data processing method according to this embodiment. The flowchart illustrated in FIG. 13 is similar to the flowchart described above with reference to FIG. 12 except that it is determined whether or not extracted time series data has been extracted in Step S8A, and Steps S2B to S6B, Step S9, and Steps S22 and S24 are added. For this reason, duplicate description will be omitted for the purpose of avoiding redundancy. The data processing method illustrated in FIG. 13 is appropriately used for generating a learning database for the substrate processing device 200.

In Step S2, time series data is acquired. Here, the time series data is used for learning the state of the substrate processing device 200. For this reason, in description here, the time series data may be referred to as learning time series data.

Here, the acquisition part 11 acquires one piece of learning time series data generated by the substrate processing device 200. Next, the process proceeds to Step S4. Step S4 and Step S6 are similar to those of the flowchart described above with reference to FIG. 12. After Step S6, next, the process proceeds to Step S8A.

In Step S8A, it is determined whether or not learning time series data is extracted as extracted time series data. In a case in which the classification part 13 classifies learning time series data into a target classification based on the evaluation value Ev, the extraction part 14 extracts the learning time series data as extracted time series data. On the other hand, in a case in which the classification part 13 classifies learning time series data into a non-target classification based on the evaluation value Ev, the extraction part 14 does not extract the learning time series data as extracted time series data.

For example, in a case in which the classification part 13 classifies learning time series data into a level 4 based on the evaluation value Ev of the learning time series data, the extraction part 14 extracts the learning time series data as extracted time series data. On the other hand, in a case in which the classification part 13 classifies learning time series data into one of levels 1 to 3, the extraction part 14 does not extract the learning time series data as extracted time series data.

In a case in which extracted time series data has not been extracted (No in Step S8A), the process is returned to Step S2. On the other hand, in a case in which extracted time series data has been extracted (Yes in Step S8A), the process proceeds to Step S10. In a case in which clustering processing has not been performed in advance, after data corresponding to a number for which unsupervised learning can be performed is extracted, the process may proceed to Step S10.

In Step S10, clustering process is performed for the extracted time series data. In accordance with this, the learning time series data is classified to one of a plurality of clusters. Next, the process proceeds to Step S22.

In Step S22, the control of the substrate processing device 200 is changed. More specifically, the control of the substrate processing device 200 or the processing part $210_A$, $210_B$, $210_C$, $210_D$ or $210_E$ that has generated the learning time series data is changed. The change of the control of the substrate processing device 200 may be performed in accordance with a program controlling the drive of the substrate processing device 200. Alternatively, the change of the control of the substrate processing device 200 may be manually input to the substrate processing device 200.

Typically, the control of the substrate processing device 200 is performed in a state in which substrate processing is temporality stopped in the substrate processing device 200. For example, in a case in which time series data TD represents a change of the amount of supply of a processing liquid for processing a substrate, and the amount of supply of the processing liquid is in an abnormal state, in order to return the amount of supply to a normal amount, the substrate processing is temporarily stopped, and a valve is adjusted. In addition, the change of the control of the substrate processing device 200 may be performed while the substrate processing using the substrate processing device 200 is continued. Next, the process proceeds to Step S2B.

In Step S2B, time series data is acquired from the substrate processing device 200 of which the control has been changed. In description here, the time series data acquired from the substrate processing device 200 of which the control has been changed may be referred to as changed time series data. Here, the acquisition part 11 acquires one piece of time series data generated by the substrate processing device 200 as changed time series data. Next, the process proceeds to Step S4B.

In Step S4B, an evaluation value (score) is acquired. The acquisition part 12 acquires an evaluation value of the changed time series data for the substrate processing device 200 of which the control has been changed. For example, similar to the learning time series data, the acquisition part 12 generates an evaluation value of the changed time series data in accordance with a specific evaluation criterion. Next, the process proceeds to Step S6B.

In Step S6B, the changed time series data is classified into one of a plurality of classifications using the evaluation value. Next, the process proceeds to Step S9.

In Step S9, it is determined whether or not the changed time series data is extracted as extracted time series data. In a case in which the classification part 13 classifies the changed time series data into a target classification, the extraction part 14 extracts the changed time series data as extracted time series data. On the other hand, in a case in which the classification part 13 classifies the changed time series data into a non-target classification, the extraction part 14 does not extract time series data that is a target as extracted time series data.

For example, in a case in which the classification part 13 classifies the changed time series data into the level 4 based on the evaluation value Ev of the changed time series data, the extraction part 14 extracts the changed time series data as extracted time series data. In addition, in a case in which the classification part 13 classifies the changed time series data into one of the levels 1 to 3, the extraction part 14 does not extract the changed time series data as extracted time series data.

In a case in which the extracted time series data has been extracted (Yes in Step S9), the process returns to Step S22. In this case, again, the substrate processing device 200 is controlled such that the control of the substrate processing device 200 is further changed. On the other hand, in a case in which the extracted time series data has not been extracted (No in Step S9), the process proceeds to Step S24.

In Step S24, information relating to details of the change of the control of the substrate processing device 200 performed in Step S22 is stored in the storage part 20 as cause and countermeasure information. The cause and countermeasure information is information relating to details of the change of the control of the substrate processing device 200 performed in Step S22. For example, the cause and countermeasure information may be information that represents details of the change of the control of the substrate processing device 200. Alternatively, the cause and countermeasure information may be information that is assumed to be a cause of an abnormal state represented by the learning time series data.

For example, an operator or a supervisor of the data processing device 100 and/or the substrate processing device 200 inputs cause and countermeasure information through the input part 40, and the storage part 20 stores the cause and countermeasure information. At this time, it is preferable to store the cause and countermeasure information in the storage part 20 together with the learning time series data for each cluster that has been clustered in Step S10. In addition, clusters, learning time series data, and the cause and countermeasure information stored in the storage part 20 are appropriately used as a learning database.

In the way described above, the data processing method according to this embodiment is performed. According to the data processing method of this embodiment, by using the acquisition part 11, the acquisition part 12, the classification part 13, and the extraction part 14 of the data processing device 100, an abnormal state of the substrate processing device 200 is determined, and, after the change of the control of the substrate processing device 200, it can be determined whether or not the abnormal state of the substrate processing device 200 has been resolved.

In addition, according to the data processing method of this embodiment, time series data of a case in which the substrate processing device 200 is in a specific state is extracted, and the time series data is processed to be clustered, and then, the cause and countermeasure information is stored. For this reason, the cause and countermeasure information that is assumed to be effective for causing the time series data of the substrate processing device 200 to return from an abnormal state to the original state can be stored together.

It is preferable that the storage part 20 should store the cluster, the extracted time series data, and the cause and countermeasure information as a learning database.

Next, the learning database of the storage part 20 will be described with reference to FIG. 14. FIG. 14 is a schematic table used for illustrating the learning database of the storage part 20.

As illustrated in FIG. 14, the learning database includes clusters classified by the clustering processing part 15, time series data included in each cluster, and cause and countermeasure information corresponding to the cluster. For example, in a table illustrated in FIG. 14, the clusters include a slow rise cluster, a peak variation cluster, and a low peak cluster.

More specifically, the slow rise cluster includes time series data TD6 and TD40 as the time series data and includes reduction in density of processing liquid/valve re-fastening as the cause and countermeasure information. The peak variation cluster includes time series data TD20 and TD41 as the time series data and includes reduction in substrate holding force/suppression of overcurrent as the cause and countermeasure information. The low peak cluster includes time series data TD80 and TD95 as the time series data and includes non-uniformity atmosphere/sensor restarting as the cause and countermeasure information.

In the description presented with reference to FIG. 14, in order to avoid excessive complications, although one set of cause and countermeasure information is represented in association with one cluster, two or more cause and countermeasure information may be associated with one cluster. In such a case, it is preferable that an association relation between generation of a cluster and cause and countermeasure information should be appropriately learned using so-called machine learning.

In this embodiment, the learning database is used for changing the control of the substrate processing device 200 and/or the processing part 210$_A$, 210$_B$, 210$_C$, 210$_D$ or 210$_E$ by using time series data generated later from the substrate processing device 200 and/or the processing part 210$_A$, 210$_B$, 210$_C$, 210$_D$ or 210$_E$. The data processing device 100 may change the control of the substrate processing device 200 in accordance with time series data generated by the substrate processing device 200 based on details of the learning stored in the learning database of the storage part.

Figure 15:
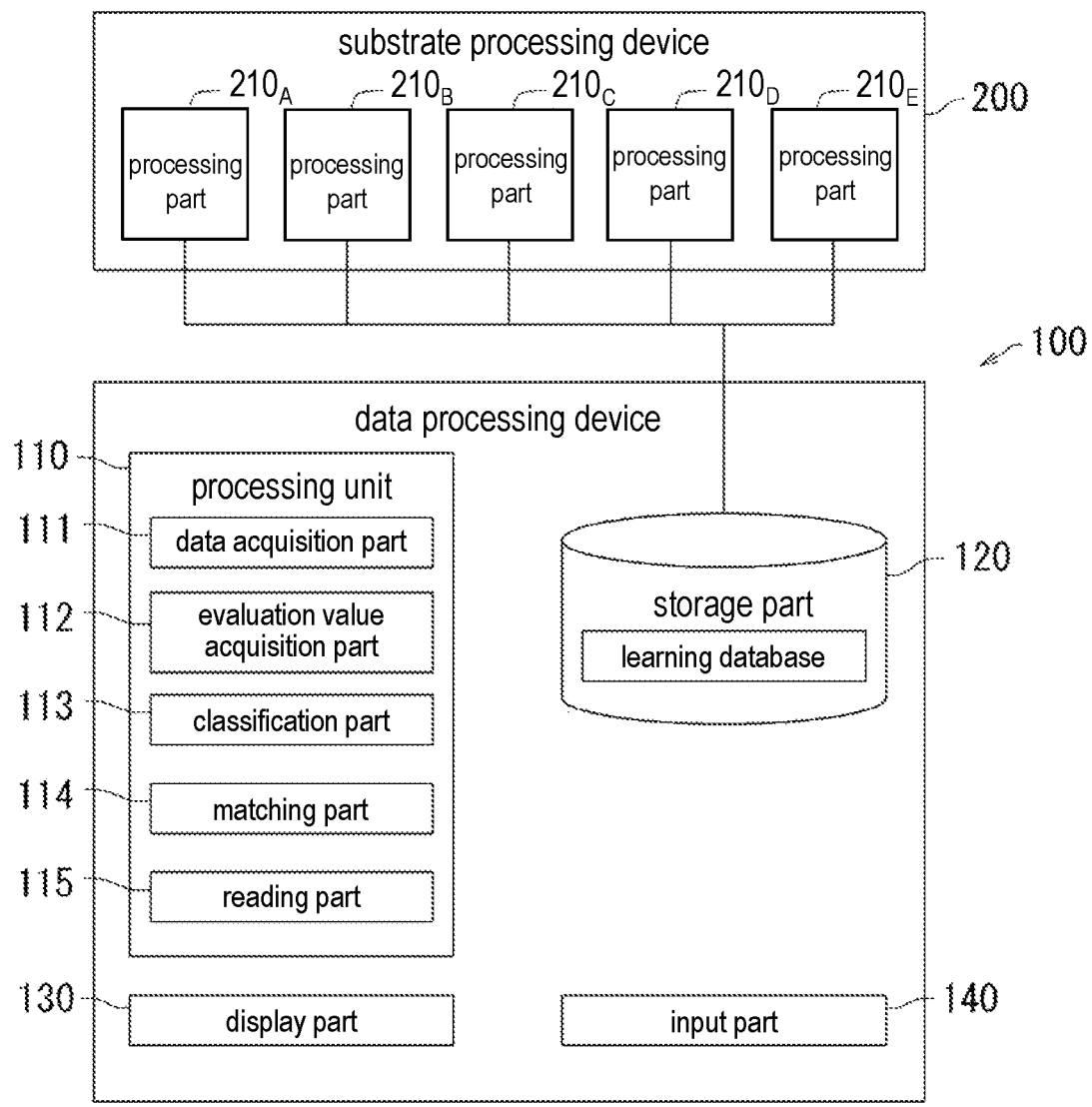
FIG. 15 is a schematic diagram of a data processing device and a substrate processing device according to this embodiment.

Next, a data processing device 100 according to this embodiment will be described with reference to FIGS. 1 to 15. FIG. 15 is a schematic diagram of the data processing device 100 according to this embodiment. The data processing device 100 includes a processing part 110, a storage part 120, a display part 130, and an input part 140. Here, a learning database is stored in the storage part 120. The display part 130 and the input part 140 respectively correspond to the display part 30 and the input part 40 described above with reference to FIG. 6.

The processing part 110 includes a data acquisition part 111, an evaluation value acquisition part 112, a classification part 113, a matching part 114, and a reading part 115. The data acquisition part 111, the evaluation value acquisition part 112, and the classification part 113 respectively correspond to the data acquisition part 11, the evaluation value acquisition part 12, and the classification part 13 described above with reference to FIG. 6.

The matching part 114 matches time series data classified into a target classification by the classification part 113 and extracted time series data stored in the learning database of the storage part 120. In description here, time series data classified into a target classification by the classification part 113 may be referred to as target time series data. In addition, time series data similar to target time series data in time series data of the learning database may be referred to as similar time series data.

The matching part 114 identifies time series data similar to the target time series data in the time series data of the learning database as similar time series data. Typically, time series data that is closest to the target time series data in the time series data of the learning database is similar time series data. However, there are cases in which there is no time series data that is similar time series data in the learning database.

Typically, the matching part 114 matches target time series data and time series data stored in the learning database in accordance with a specific evaluation criterion. For example, the matching part 114 matches target time series data and time series data of the learning database for the entire time series data. For example, the matching part 114 may process target time series data and time series data of the learning database through a vector analysis. Alternatively, the matching part 114 may match target time series data and time series data stored in the learning database for a specific part of the time series data. By using the matching part 114, similar time series data close to target time series data is identified in the time series data stored in the learning database of the storage part 120. The matching between target time series data and similar time series data may be performed in accordance with the same evaluation criterion as that of the evaluation value acquisition part 112 or an evaluation criterion different from that of the evaluation value acquisition part 112.

Thereafter, the reading part 115 identifies a cluster corresponding to the similar time series data in the learning database of the storage part 120 and reads the cause and countermeasure information corresponding to the identified cluster. Typically, the display part 130 displays the cause and countermeasure information.

According to the data processing device 100 of this embodiment, similar time series data close to the target time series data and corresponding cause and countermeasure information are read from the learning database. For this reason, the data processing device 100 can acquire appropriate cause and countermeasure information for the target time series data classified into a specific classification.

Figure 16:
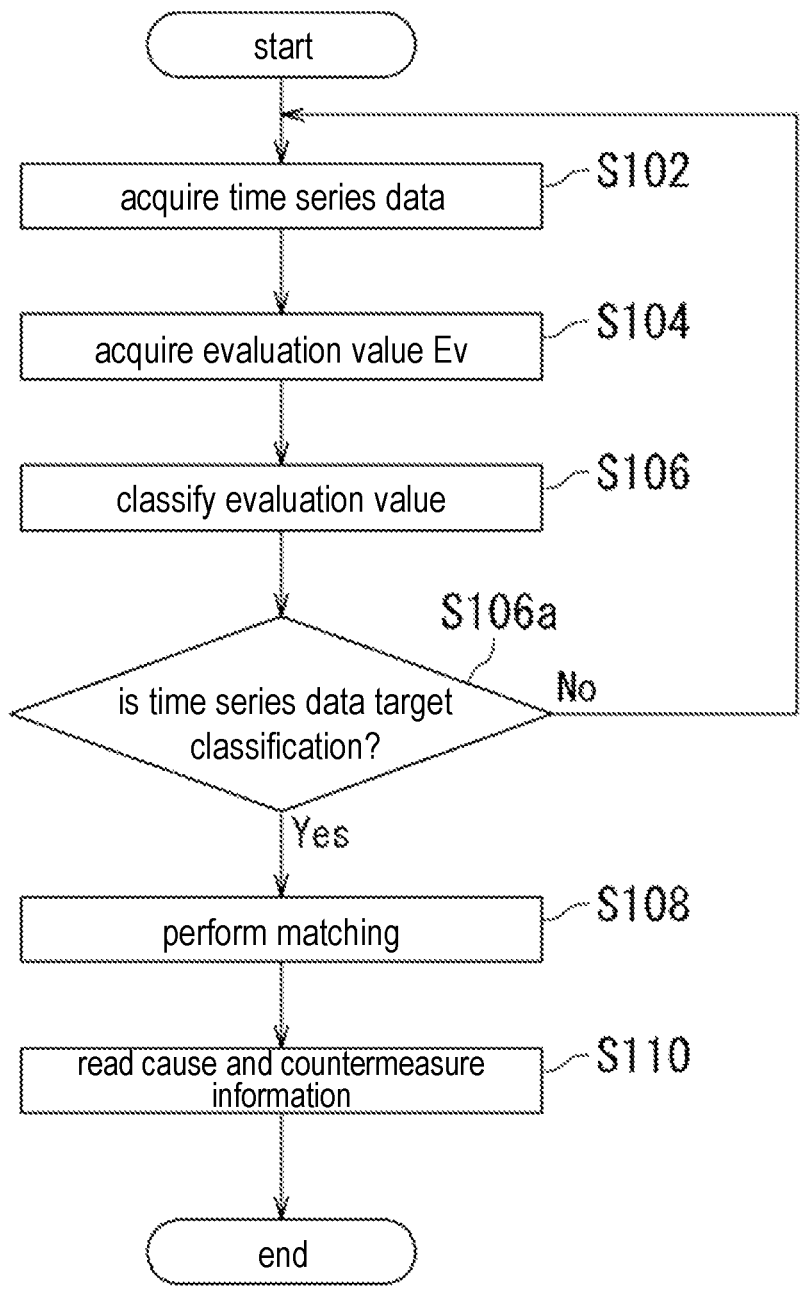
FIG. 16 is a flowchart of a data processing method according to this embodiment.

Next, a data processing method according to this embodiment will be described with reference to FIGS. 1 to 16. FIG. 16 illustrates a flowchart of the data processing method according to this embodiment. Steps S102 to S106 illustrated in FIG. 16 respectively correspond to Steps S2 to S6 illustrated in FIG. 12.

As illustrated in FIG. 16, in Step S102, time series data is acquired. The time series data is data that is generated by the substrate processing device 200. Next, the process proceeds to Step S104.

In Step S104, an evaluation value (score) of the time series data is acquired. The acquisition part 12 acquires an evaluation value of the time series data. For example, the acquisition part 12 acquires an evaluation value of the time series data in accordance with the same evaluation criterion as that at the time of generating the learning database. Next, the process proceeds to Step S106.

In Step S106, the time series data is classified into one of a plurality of classifications by using the evaluation value of the time series data. For example, the classification part 13 classifies the time series data into one of a plurality of classifications using the same evaluation value as that at the time of generating the learning database. Next, the process proceeds to Step S106*a*.

In Step S106*a*, it is determined whether or not the time series data has been classified into a target classification. For example, the target classification is the level 4.

In a case in which the time series data has not been classified into the target classification (No in Step S106*a*), the process returns to Step S102. On the other hand, in a case in which the time series data has been classified into the target classification (Yes in Step S106*a*), the process proceeds to Step S108.

In Step S108, the target time series data and time series data stored in the learning database of the storage part 120 are matched with each other. The matching part 114 matches the target time series data and the time series data stored in the learning database of the storage part 120. The matching part 114 identifies similar time series data in the extracted time series data stored in the learning database of the storage part 120. Next, the process proceeds to Step S110.

In Step S110, the cause and countermeasure information corresponding to the similar time series data is read from the learning database. The reading part 115 identifies a cluster corresponding to the similar time series data in the learning database of the storage part 120 and reads the cause and countermeasure information corresponding to the identified cluster.

Typically, thereafter, the display part 130 displays the cause and countermeasure information. In addition, as is necessary, an operator or a supervisor of the data processing device 100 and/or the substrate processing device 200 may change the control of the substrate processing device 200 based on the displayed cause and countermeasure information.

In this way described above, the data processing method according to this embodiment is performed. According to the data processing method of this embodiment, matching is performed for target time series data recognized as being abnormal through an evaluation value. For this reason, the amount of calculation relating to a matching process can be reduced.

In addition, according to this embodiment, the cause and countermeasure information corresponding to the cluster of the target time series data can be acquired from the learning database. For this reason, even in a case in which the time series data is abnormal, the cause and countermeasure information corresponding to the time series data can be acquired from the learning database. Therefore, an abnormal state of the substrate processing device 200 can be effectively perceived.

Typically, although an operation-skilled person of the substrate processing device can predict the state of the substrate processing device from time series data acquired from the substrate processing device, an unskilled operator cannot predict the state of the substrate processing device from time series data acquired from the substrate processing device. However, according to the data processing method of this embodiment, in a case in which the target time series data of the substrate processing device 200 is abnormal, the cause and countermeasure information of the substrate processing device 200 can be acquired using the learning database generated in the past. For this reason, even when an operator of the substrate processing device 200 is unskilled, a malfunction of the substrate processing device 200 can be resolved.

In the description presented with reference to FIG. 16, in Step S110, although the cause and countermeasure information is read, and then, an operator or a supervisor changes the control of the substrate processing device 200 based on the displayed cause and countermeasure information, this embodiment is not limited thereto. The substrate processing device 200 may change the control of the substrate processing device 200 based on the read cause and countermeasure information without the intervention of an operator or a supervisor.

In the description presented above with reference to FIG. 16, in the matching of Step S108, although similar time series data is identified from the learning database, in a case in which the time series data acquired in Step S102 is extremely abnormal, cases in which similar time series data is not identified from the learning database may be also considered. In such cases, the time series data acquired in Step S102 may be stores in an additional storage part 120.

Figure 17:
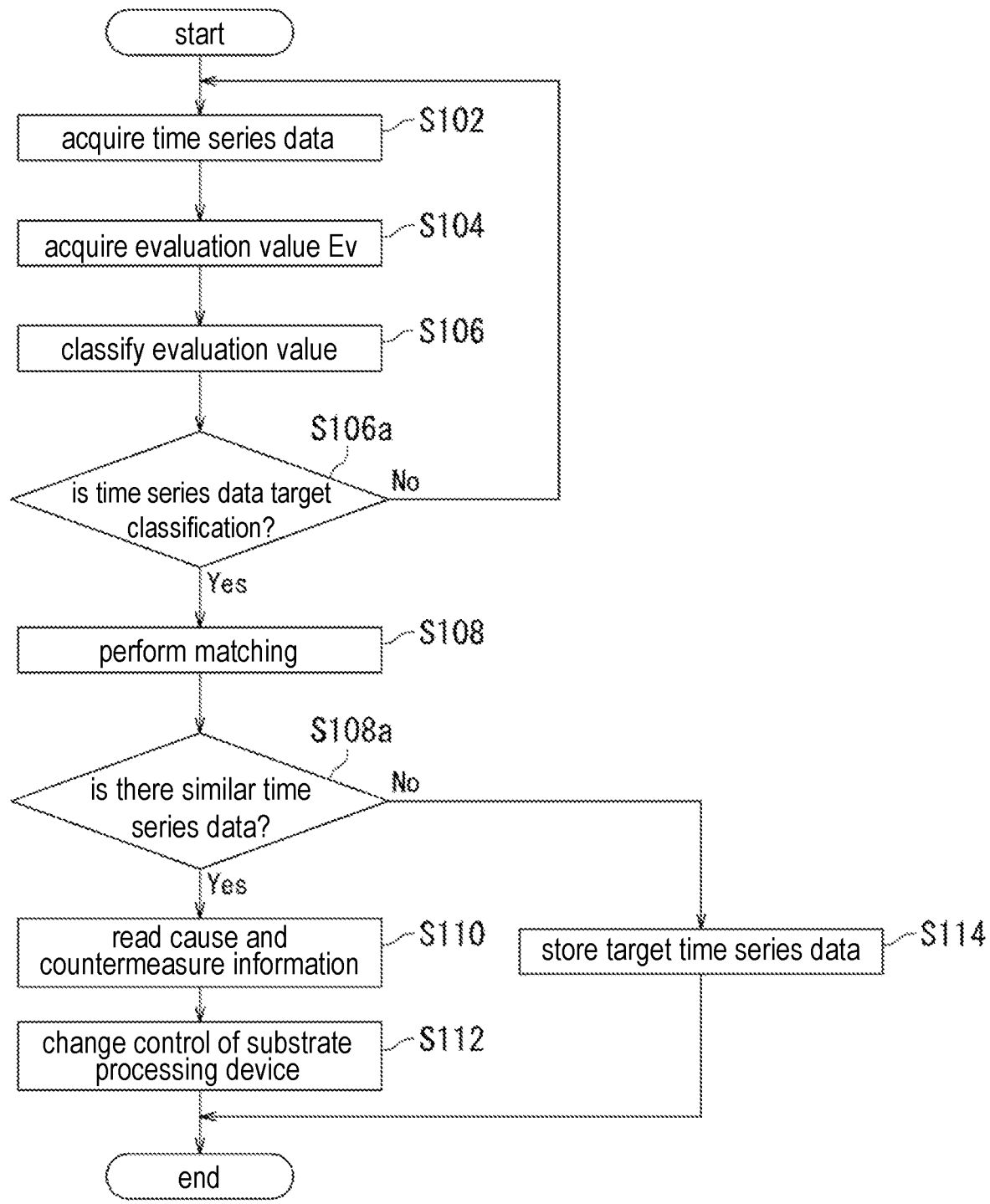
FIG. 17 is a flowchart of the data processing method according to this embodiment.

Next, a data processing method according to this embodiment will be described with reference to FIGS. 1 to 17. FIG. 17 illustrates a flowchart of the data processing method according to this embodiment. The flowchart of the data processing method illustrated in FIG. 17 is similar to the flowchart illustrated in FIG. 16 except for addition of Step S108a and Steps S112 to S114, and thus duplicate description will be omitted for avoiding redundancy.

As described above, in Step S108, target time series data and time series data stored in the learning database of the storage part 120 are matched with each other. The matching part 114 matches the target time series data and the time series data stored in the learning database of the storage part 120. For example, the matching is performed by acquiring a matching rate between the target time series data and the time series data of the learning database. Next, the process proceeds to Step S108a.

In Step S108a, it is determined whether or not there is similar time series data that is similar to the target time series data in the learning database. For example, the matching part 114 may determine whether or not there is similar time series data that is similar to the target time series data in the learning database in accordance with whether or not a matching rate exceeds a threshold. For example, in a case in which the matching rate is higher than the threshold, the matching part 114 determines that there is similar time series data. On the other hand, in a case in which the matching rate is equal to or lower than the threshold, the matching part 114 determines that there is no similar time series data.

In a case in which it is determined that there is similar time series data (Yes in Step S108a), the process proceeds to Step S110. On the other hand, in a case in which it is determined that there is no similar time series data (No in Step S108a), the process proceeds to Step S114.

In Step S110, the cause and countermeasure information corresponding to the similar time series data is read from the learning database. The reading part 115 reads the cause and countermeasure information corresponding to the similar time series data from the learning database of the storage part 120. The process proceeds to Step S112.

In Step S112, the control of the substrate processing device 200 is changed based on the cause and countermeasure information. For example, the processing part 110 notifies an operator or a supervisor of the cause and countermeasure information. For example, the display part 130 displays the cause and countermeasure information.

In Step S114, the target time series data is stored in the learning database of the storage part 120. At this time, it is preferable that the storage part 120 should store information representing a new cluster corresponding to the target time series data together with the target time series data. In addition, in this case, the display part 130 may display that the matching rate is equal to or lower than the threshold.

In this way described above, the data processing method according to this embodiment is performed. According to the data processing method of this embodiment, the cause and countermeasure information corresponding to the cluster of the target time series data is read from the learning database and is displayed, and thus, an operator or a supervisor of the data processing device 100 can acquire the cause and countermeasure information for the substrate processing device 200.

Next, the time series data TD will be described in detail with reference to FIGS. 18A to 20. Typically, the time series data TD can be decomposed into a rise part, a stabilized period part, and a fall part in accordance with the shape of a graph. Typically, the time series data TD represents a time change of a physical quantity in response to a predetermined control signal.

First, the time series data TD will be described with reference to FIGS. 18A and 18B. FIG. 18A is a graph illustrating changes of a control signal CS with respect to time in the substrate processing device 200. FIG. 18B is a graph representing time series data TD that represents a time change of a physical quantity controlled in accordance with the control signal CS.

As illustrated in FIG. 18A, the control signal CS is in a low level at an initial state (a time t0). The control signal CS changes from the low level to a high level at a time t1 and changed from the high level to the low level at a time t2.

As illustrated in FIG. 18B, the time series data TD changes between the initial level L0 and a target level L1 (here, L0<L1) in accordance with the control signal CS.

The time series data TD has the initial level L0 in the initial state (at the time t0). When the control signal CS changes from the low level to the high level at the time t1, the time series data TD starts to rise from the initial level L0 toward a target level L1. Here, after rising over the target level L1, the time series data TD falls. The time series data TD repeats to rise and fall near the target level L1 and finally is stabilized near the target level L1.

Thereafter, when the control signal CS changes from the high level to the low level at the time t2, the time series data TD starts to fall from near the target level L1 toward the initial level L0. After falling to the initial level L0 or near the initial level L0, the time series data TD rises. The time series data TD repeats to rise and fall near the initial level L0 and, finally, is stabilized at the initial level L0.

For example, in the time series data TD, a first range R1 including the target level L1 and a second range R2 including the initial level L0 are set. For example, a range of 90% to 110% of the target level L1 is set as the first range R1, and a range of −10% to 10% of the target level L1 is set as the second range R2. An upper limit and a lower limit of the first range R1 and an upper limit and a lower limit of the second range R2 are arbitrarily determined by a user.

The evaluation value acquisition part 12 may acquire an evaluation value from the time series data TD as below. First, the evaluation value acquisition part 12 acquires a period until the time series data TD enters the first range R1 after the control signal CS starts to change from the low level to the high level as a "period A (a period of increase)", acquires a period until the time series data TD enters the second range R2 after the control signal CS changes from the high level to the low level as a "period C (a period of decrease)", and acquires a period between the period of increase and the period of decrease as a "period B (stabilized period)". Here, "the time series data entering a certain range" represents that the time series data does not take a value outside the range after the time point.

The evaluation value acquisition part 12 may acquire an evaluation value from one part of the "period A", the "period B", and the "period C". For example, the evaluation value acquisition part 12 may acquire an evaluation value from the "period A". Alternatively, the evaluation value acquisition part 12 may acquire an evaluation value from the "period B" or the "period C".

For example, the evaluation value acquisition part 12 acquires a score in the period of increase, a score in the stabilized period, and a score in the period of decrease using a method set in advance. For example, the evaluation value acquisition part 12 may acquire a length of the period of increase as a score in the period of increase and acquire a length of the period of decrease as a score in the period of decrease. In this way, the evaluation value acquisition part 12 may use the lengths of the "period A", the "period B", and the "period C" as evaluation values. Alternatively, the evaluation value acquisition part 12 may use an average or a sum value of the lengths of the "period A", the "period B", and the "period C" as an evaluation value.

Alternatively, the evaluation value acquisition part 12 may acquire a certain value (score) from each of the "period A", the "period B", and the "period C" and acquire an evaluation value by performing determination, comparison, and/or addition of such scores.

The evaluation value acquisition part 12 may acquire statistical values of the time series data TD in the "period A", the "period B", and the "period C" as evaluation values or scores of the "period A", the "period B", and the "period C".

For example, the evaluation value acquisition part 12 may acquire an outbreak value in the stabilized period using a plurality of time series data as a score in the stabilized period. The evaluation value acquisition part 12 acquires an average value, a median value, or a dispersion value of the time series data TD in the stabilized period as a score in the stabilized period.

Figure 19:
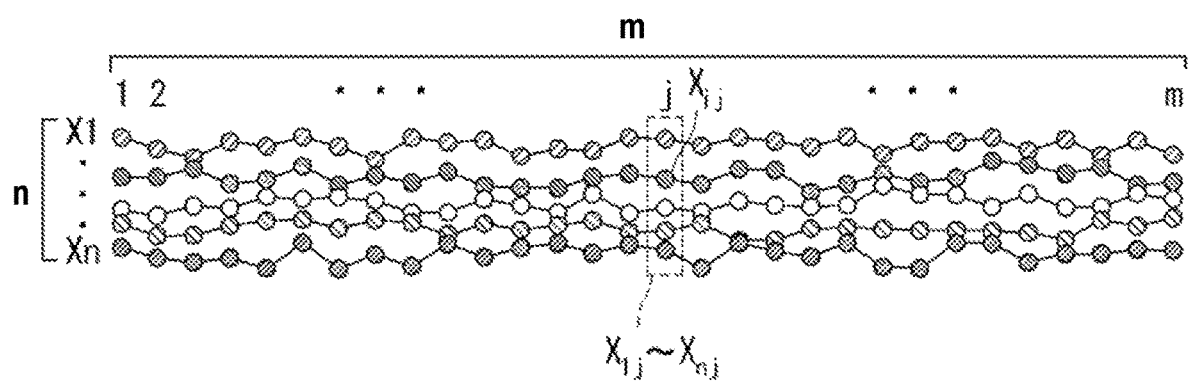
FIG. 19 is a schematic diagram illustrating values of a plurality of time series data.

FIG. 19 is a diagram illustrating values of a plurality of time series data. Each of n time series data TD1, TD2, . . . , TDn illustrated in FIG. 19 include m values. Here, when i is an integer equal to or larger than 1 and equal to or smaller than n, and j is an integer equal to or larger than 1 and equal to or smaller than m, the j-th data included in time series data TDi will be denoted as $x_{ij}$. In this case, the evaluation value acquisition part 12 acquires a score Sp of time series data TDp in accordance with the following Equations (1) to (4).

$$\mu_{pj} = \frac{1}{n-1} \sum_{i=1, i \neq p}^{n} x_{ij} \quad (1)$$

$$\mu_p = \frac{1}{(n-1)m} \sum_{i=1, i \neq p}^{n} \sum_{j=1}^{m} x_{ij} \quad (2)$$

$$\sigma_p^2 = \frac{1}{(n-1)m-1} \sum_{i=1, i \neq p}^{n} \sum_{j=1}^{m} (x_{ij} - \mu_p)^2 \quad (3)$$

$$S_p = \max_{1 \leq j \leq m} \left( \frac{|x_{pj} - \mu_{pj}|}{\sigma_p} \right) \quad (4)$$

In Equation (1), a value $\mu_{pj}$ represents an average value of the j-th data included in (n−1) time series data except time series data TDp that is a target. In Equation (2), a value p represents an average value of all the data included in (n−1) time series data except the time series data TDp. In Equation (3), a value $\sigma_p^2$ represents a dispersion of (n−1) time series data except the time series data TDp.

The evaluation value acquisition part 12 may acquire an overshooting amount of the time series data TD as a score in the period of increase. When a target level of the time series data TD is denoted by L1, and a maximum value of the time series data TD is denoted by M, the evaluation value acquisition part 12 may acquire an overshooting amount V of the time series data in accordance with Equation (5).

$$V=(M-L1)/L1\times100 \quad (5)$$

Alternatively, the evaluation value acquisition part 12 may acquire an overshooting amount V of the time series data in accordance with Equation (6).

$$V=M-L1 \quad (6)$$

The method of acquiring an evaluation value described above is merely an example and, apparently is not limited thereto. For example, as described above with reference to FIG. 4B, an evaluation value may be acquired by adding squares of differences between the values of the time series data TD and the values of the reference data RD.

The classification part 13 (FIG. 1 and the like) may classify time series data TD into one of a plurality of classifications by processing the evaluation values Ev of a plurality of time series data TD.

Figure 20A:
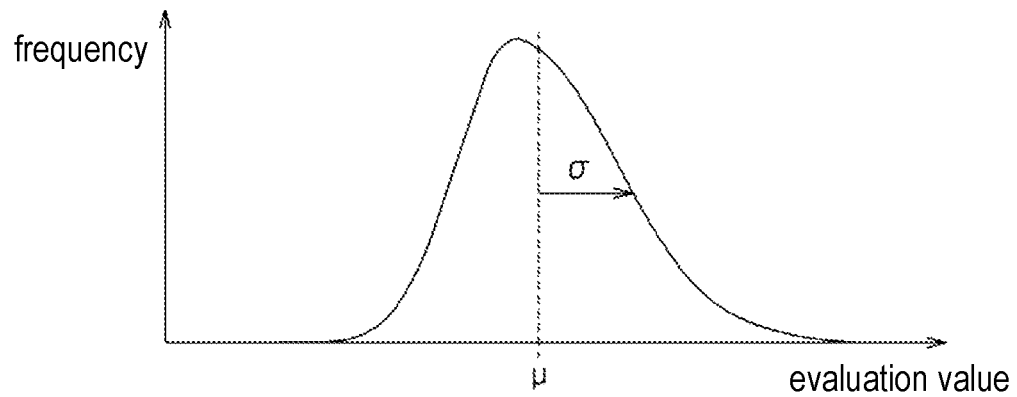
FIG. 20A is a graph illustrating an evaluation value distribution.

Next, an example of a classification process performed by the classification part 13 will be described with reference to FIGS. 20A and 20B. FIG. 20A is a graph illustrating an evaluation value distribution. The evaluation value distribution represents a frequency (times) of evaluation values Ev for each of a plurality of time series data TD. In the graph illustrated in FIG. 20A, the horizontal axis represents the magnitude of the evaluation value Ev, and the vertical axis represents the frequency (times or the number of times of appearance) of the evaluation value Ev.

In FIG. 20A, $\mu$ represents an average value of a plurality of evaluation values Ev, and a represents a standard deviation. As illustrated in FIG. 20A, the evaluation value distribution exhibits a peak near the average value $\mu$. The evaluation value distribution has a shape close to a normal distribution.

The classification part 13 standardizes the evaluation value distribution. More specifically, the classification part 13 generates a standardized distribution acquired by standardizing the evaluation value distribution in accordance with Equation (7).

$$S_{new} = \frac{Sold - \mu}{\sigma} \quad (7)$$

Here, Sold represents an evaluation value distribution, and Snew represents a standardized distribution.

Figure 20B:
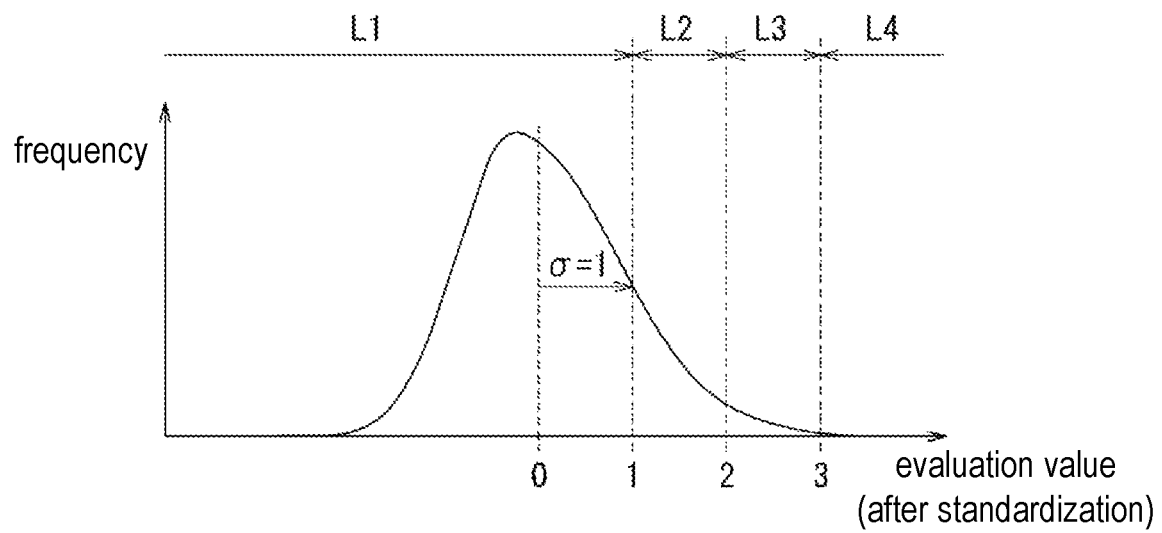
FIG. 20B is a graph illustrating a standardization result of an evaluation value distribution.

FIG. 20B is a graph illustrating a standardized distribution. The standardized distribution is generated by performing a standardization process such that the average value of the evaluation value distribution is 0, and the standard deviation is 1.

For example, the standardized distribution is classified into L1 to L4. In the standardized distribution, in the case of being smaller than 1, the level is the level 1 (L1), in the case of being equal to or larger than 1 and smaller than 2, the level is the level 2 (L2), in the case of being equal to or larger than 2 and smaller than 3, the level is the level 3 (L3), and in the case of being equal to or larger than 3, the level is the level 4 (L4). Here, a level represents a degree of abnormality.

Here, the classification is performed using a standard deviation. For this reason, an operator or a supervisor may not individually input a threshold used at the time of determining abnormality.

In the description presented with reference to FIGS. 18A to 20B, although the evaluation value acquisition part 12 and the classification part 13 have been mainly described, it may be applied to the evaluation value acquisition part 112 and the classification part 113. In addition, it may be applied to the clustering processing part 15 and/or the matching part 114.

Although the processing part 10 stores the learning database representing the state of the substrate processing device 200 in the storage part 20 in the data processing device 100 illustrated in FIG. 10, and the processing part 110 uses the learning database stored in the storage part 120 in the data processing device 100 illustrated in FIG. 15, the processing part of the data processing device 100 may store a learning database representing the state of the substrate processing device 200 in the storage part and use the learning database stored in the same storage part.

Figure 21:
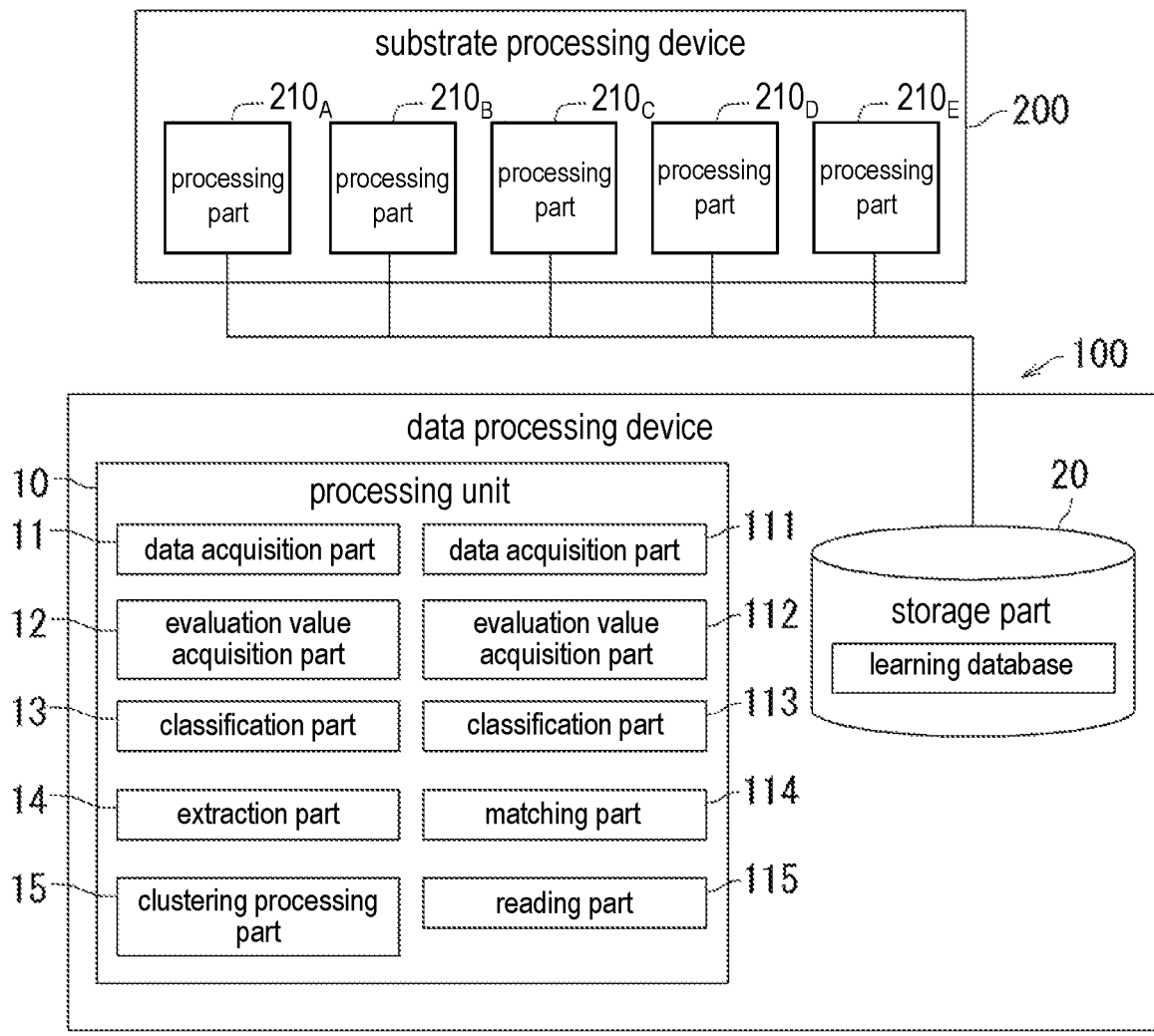
FIG. 21 is a schematic diagram of a data processing device and a substrate processing device according to this embodiment.

Next, a data processing device 100 and a substrate processing device 200 according to this embodiment will be described with reference to FIG. 21. FIG. 21 is a schematic diagram of the data processing device 100 and the substrate processing device 200.

As illustrated in FIG. 21, the data processing device 100 includes a processing part 10 and a storage part 20. The processing part 10 includes a data acquisition part 111, an evaluation value acquisition part 112, a classification part 113, a matching part 114, and a reading part 115 in addition to a data acquisition part 11, an evaluation value acquisition part 12, a classification part 13, an extraction part 14, and a clustering processing part 15. The storage part 20 stores a learning database.

The processing part 10 can store the learning database in the storage part 20 by using the data acquisition part 11, the evaluation value acquisition part 12, the classification part 13, the extraction part 14, and the clustering processing part 15. In addition, the processing part 10 can utilize the learning database stored in the storage part 20 by using the data acquisition part 111, the evaluation value acquisition part 112, the classification part 113, the matching part 114, and the reading part 115.

Generally, the substrate processing device 200 can be largely divided into a sheet type and a batch type. The substrate processing device 200 may be either the sheet type or the batch type.

Figure 22:
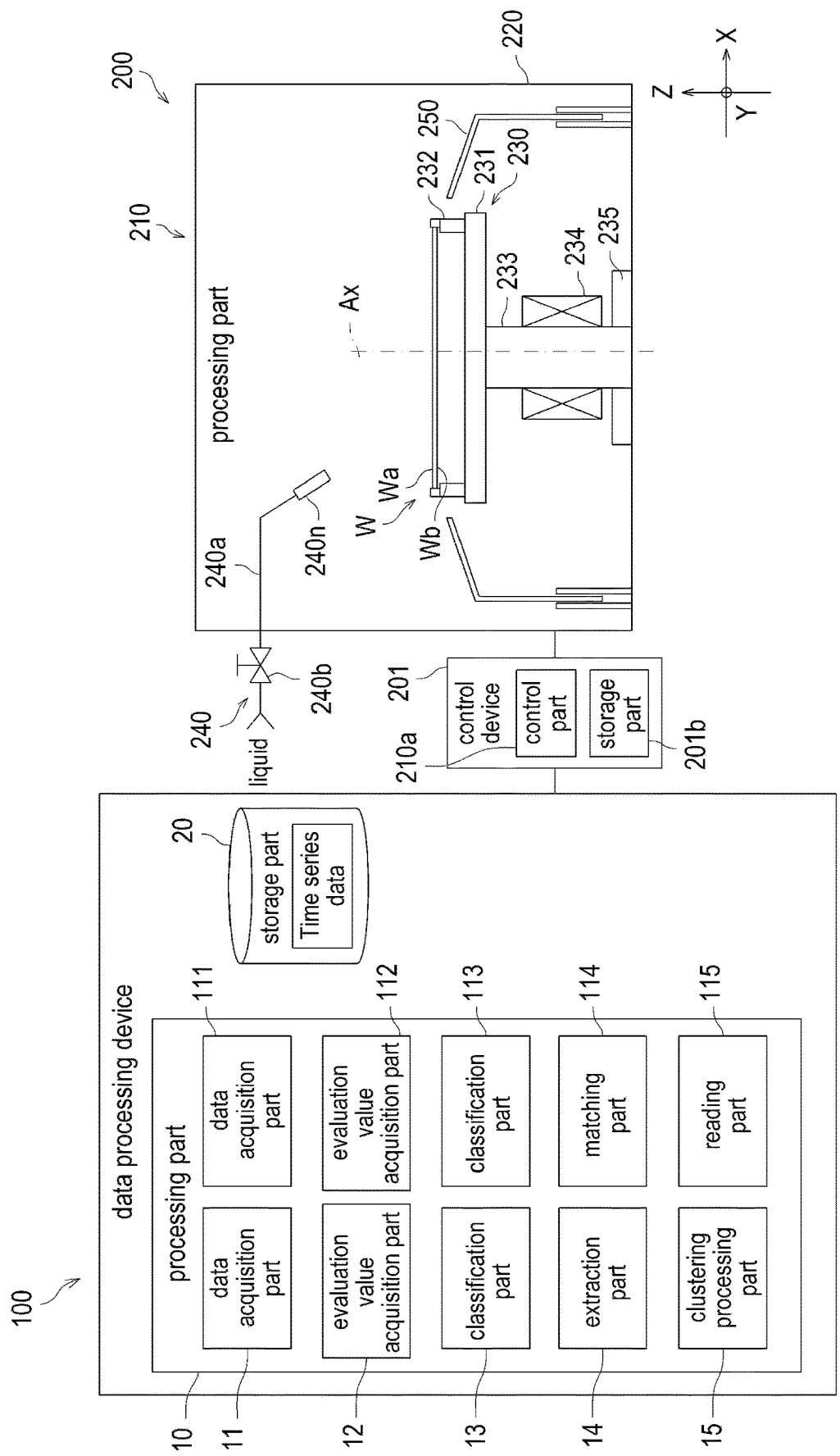
FIG. 22 is a schematic diagram of a data processing device and a substrate processing device according to this embodiment.

Next, the data processing device 100 and the substrate processing device 200 according to this embodiment will be described with reference to FIG. 22. FIG. 22 is a schematic diagram of the data processing device 100 and the substrate processing device 200.

The data processing device 100 processes time series data TD generated by the substrate processing device 200. Here, the substrate processing device 200 is the sheet type.

The substrate processing device 200 processes a substrate W. The substrate processing device 200 processes a substrate W such that at least one of etching, a surface treatment, characteristics imparting, formation of a processing film, removal of at least a part of a film, and cleaning is performed for the substrate W.

The substrate W, for example, includes a semiconductor wafer, a substrate for a liquid crystal display device, a substrate for plasma display, a substrate for field emission display (FED), a substrate for an optical disc, a substrate for a magnetic disk, a substrate for an optical magnetic disk, a substrate for a photo mask, a ceramic substrate, and a substrate for a solar cell. For example, the substrate W has an approximate disc shape. The substrate processing device 200 processes one substrate W at each time.

The substrate processing device 200 includes a chamber 220, a substrate holding part 230, and a liquid supply part 240 as processing parts $210_A$, $210_B$, $210_C$, $210_D$ and $210_E$. The chamber 220 houses a substrate W. The substrate holding part 230 holds the substrate W.

The chamber 220 has an approximate box shape having an internal space. The chamber 220 houses a substrate W. Typically, the chamber 220 is in an air atmosphere. In the chamber 220, an air flow may be formed in accordance with a down flow or the like.

Here, the substrate processing device 200 is a sheet type that processes one substrate W each time, and one substrate W is housed in the chamber 220 each time. The substrate W is housed inside the chamber 220 and is processes inside the chamber 220. In the chamber 220, at least a part of each of the substrate holding part 230 and the liquid supply part 240 is housed.

The substrate holding part 230 holds a substrate W. For example, the substrate holding part 230 pinches ends of the substrate W. The substrate holding part 230 horizontally holds the substrate W such that an upper face (front face) Wa of the substrate W is directed upward, and a rear face (lower face) Wb of the substrate W is directed vertically downward. The substrate holding part 230 rotates the substrate W in a state in which the substrate W is held. For example, when seen from the vertically upward side, the substrate W rotates counterclockwise.

For example, the substrate holding part 230 includes a spin base 231, a chuck member 232, a shaft 233, an electric motor 234, and a base part 235. For example, the spin base 231 has a plate shape extending in an XY plane. Here, the spin base 231 has a disc shape (thin disc shape). The spin base 231 faces the substrate W.

The chuck member 232 is disposed in the spin base 231. The chuck member 232 fixes (chucks) the substrate W. Typically, a plurality of chuck members 232 are disposed in the spin base 231.

The shaft 233 may be a hollow shaft. The shaft 233 extends in a vertical direction along a rotation axis Ax. The spin base 231 is combined at an upper end of the shaft 233. The substrate W is placed above the spin base 231.

The shaft 233 extends downward from the center part of the spin base 231. The electric motor 234 provides a rotation force for the shaft 233. The shaft 233 rotates with respect to the base part 235. The base part 235 supports the shaft 233 to be rotatable. The electric motor 234 rotates the substrate W and the spin base 231 around the rotation axis Ax by rotating the shaft 233 in a rotation direction. The electric motor 234 is an example of a rotation member.

The liquid supply part 240 supplies a liquid to the substrate W. Typically, the liquid supply part 240 supplies a liquid to the upper face Wa of the substrate W. For example, the liquid includes a rinse liquid or a drug solution.

The rinse liquid may include any one of deionized water (DIW), carbonated water, electrolytic ionic water, ozone water, ammonia water, hydrochloric acid water having a diluted density (for example, about 10 ppm to 100 ppm), or reduced water (hydrogen water).

The drug solution includes hydrofluoric acid. For example, the hydrofluoric acid may be heated at a temperature equal to or higher than 40° C. and equal to or lower than 70° C. or may be heated at a temperature equal to or higher than 50° C. and equal to or lower than 60° C. The hydrofluoric acid may not be heated. In addition, the drug solution may contain water or phosphoric acid.

In addition, the drug solution may further contain a hydrogen peroxide solution. The drug solution may contain SC1 (ammonia hydrogen peroxide solution mixture), SC2 (hydrochloric acid hydrogen peroxide solution mixture), or aqua regia (a mixture of concentrated hydrochloric acid and concentrated nitric acid).

The substrate processing device 200 further includes a cup 250. The cup 250 collects a liquid scattering from the substrate W. The cup 250 rises and falls. For example, the cup 250 rises vertically upward to the lateral side of the substrate W over a period in which the liquid supply part 240 supplies a liquid to the substrate W. In this case, the cup 250 collects a liquid scattering from the substrate W in accordance with rotation of the substrate W. When the period in which the liquid supply part 240 supplies the liquid to the substrate W ends, the cup 250 falls vertically downward from the lateral side of the substrate W.

The control device 201 includes a control part 201a and a storage part 201b. The control part 201a controls the substrate holding part 230, the liquid supply part 240, and/or the cup 250. For example, the control part 201a controls the electric motor 234, the valve 240b and/or the cup 250.

The substrate processing device 200 according to this embodiment is appropriately used for manufacturing a semiconductor device in which a semiconductor is disposed. The substrate processing device 200 is appropriately used for cleaning and/or processing (for example, etching, characteristic changing, and the like) of the semiconductor device at the time of manufacturing the semiconductor device.

As described above, the substrate processing device 200 may be the sheet type. In such a case, it is preferable that the substrate processing device 200 should include a plurality of processing parts $210_A$, $210_B$, $210_C$, $210_D$ and $210_E$.

Figure 23:
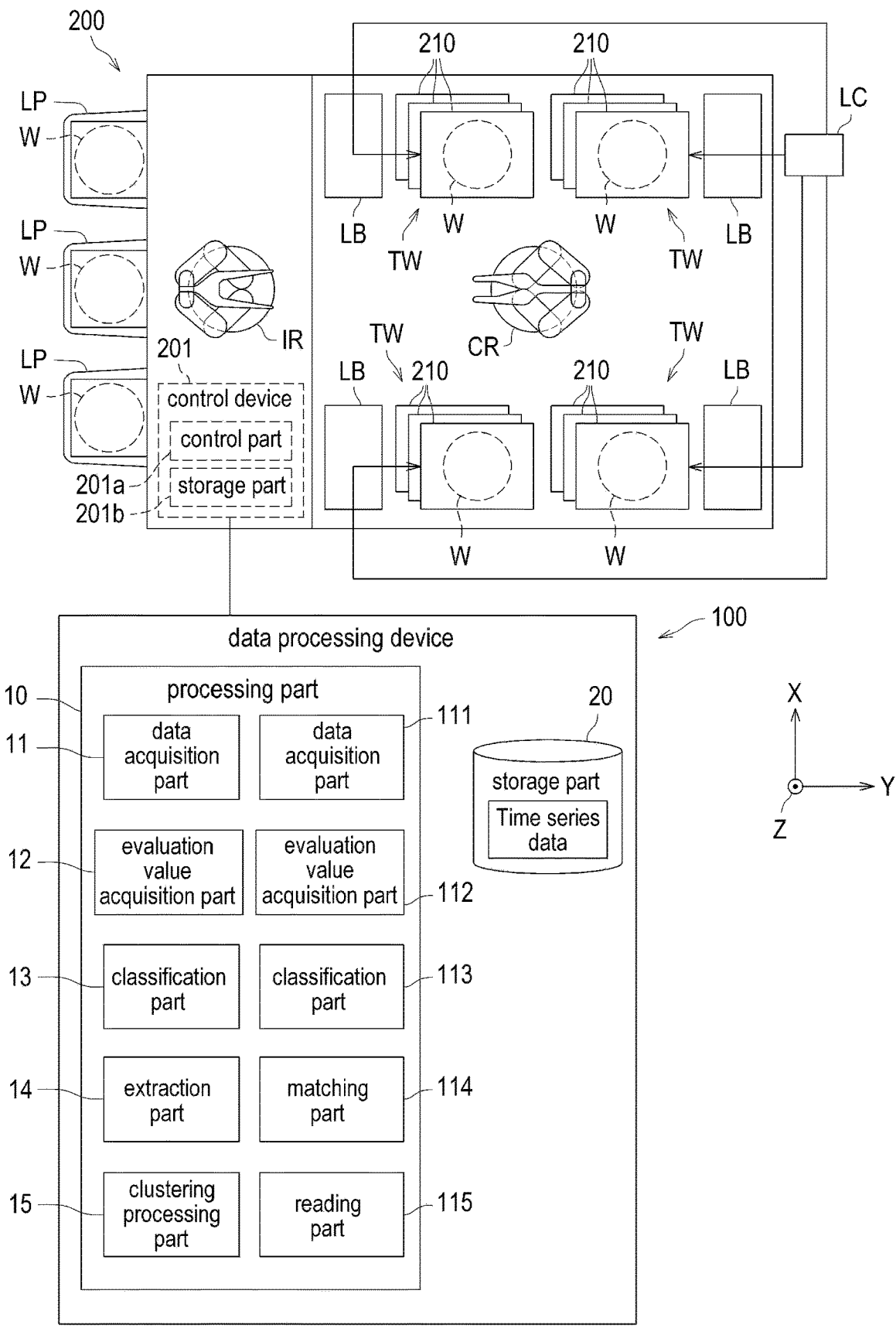
FIG. 23 is a schematic diagram of a data processing device and a substrate processing device according to this embodiment.

Next, a data processing device 100 and a substrate processing device 200 according to this embodiment will be described with reference to FIG. 23. FIG. 23 is a schematic diagram of the data processing device 100 and the substrate processing device 200. Here, the substrate processing device 200 includes a plurality of processing parts 210. Each of the processing parts $210_A$, $210_B$, $210_C$, $210_D$ and $210_E$ processes a substrate W. The plurality of processing parts $210_A$, $210_B$, $210_C$, $210_D$ and $210_E$ is disposed in a predetermined arrangement.

As illustrated in FIG. 23, the substrate processing device 200 includes a plurality of processing parts $210_A$, $210_B$, $210_C$, $210_D$ and $210_E$, a fluid cabinet LC, fluid boxes LB, a plurality of load ports LP, an indexer robot IR, a center robot CR, and a control device 201. The control device 201 controls the load ports LP, the indexer robot IR, and the center robot CR. The control device 201 includes a control part 201a and a storage part 201b.

Each of the load ports LP houses a plurality of substrates W in a stacking manner. The indexer robot IR conveys the substrate W between the load ports LP and the center robot CR. The center robot CR conveys the substrate W between the indexer robot IR and the processing part 210. Each of the processing parts $210_A$, $210_B$, $210_C$, $210_D$ and $210_E$ discharges a liquid to the substrate W and processes the substrate W. For example, the liquid includes a processing liquid, a rinse liquid, and/or a drug solution. The fluid cabinet LC houses a liquid. The fluid cabinet LC may house a gas.

More specifically, the plurality of processing parts $210_A$, $210_B$, $210_C$, $210_D$ and $210_E$ form a plurality of towers TW (four towers TW in FIG. 1) disposed to surround the center robot CR in the plan view. Each of the towers TW includes a plurality of processing parts $210_A$, $210_B$, $210_C$, $210_D$ and $210_E$ (three processing parts $210_A$, $210_B$, $210_C$, $210_D$ and $210_E$ in FIG. 1) that are vertically stacked. The fluid boxes LB respectively correspond to a plurality of towers TW. A liquid disposed inside the fluid cabinet LC is supplied to all the processing parts $210_A$, $210_B$, $210_C$, $210_D$ and $210_E$ included in the tower TW corresponding to one fluid box LB through the fluid box LB. In addition, a gas disposed inside the fluid cabinet LC is supplied to all the processing parts $210_A$, $210_B$, $210_C$, $210_D$ and $210_E$ included in the tower TW corresponding to one fluid box LB through the fluid box LB.

The substrate processing device 200 further includes a control device 201. The control device 201 controls various operations of the substrate processing device 200.

The control device 201 includes a control part 201a and a storage part 201b. The control part 201a includes a processor. The control part 201a, for example, includes a central processing part (CPU). Alternatively, the control part 201a may include a general-purpose arithmetic unit.

The storage part 201b stores data and a computer program. The data includes recipe data. The recipe data includes information that represents a plurality of recipes. Each of the plurality of recipes defines details of the processing and the processing sequence of the substrate W.

The storage part 201b includes a main storage device and an auxiliary storage device. For example, the main storage device is a semiconductor memory. For example, the auxiliary storage device is a semiconductor memory and/or a hard disk drive. The storage part 201b may include a removable medium. The control part 201a executes a substrate processing operation by executing the computer program stored in the storage part 201b.

In the description presented above with reference to FIGS. 22 and 23, although the substrate processing device 200 and/or the processing part $210_A$, $210_B$, $210_C$, $210_D$ or $210_E$ are the sheet type, this embodiment is not limited thereto. The substrate processing device 200 and/or the processing part $210_A$, $210_B$, $210_C$, $210_D$ or $210_E$ may be a batch type.

Figure 24:
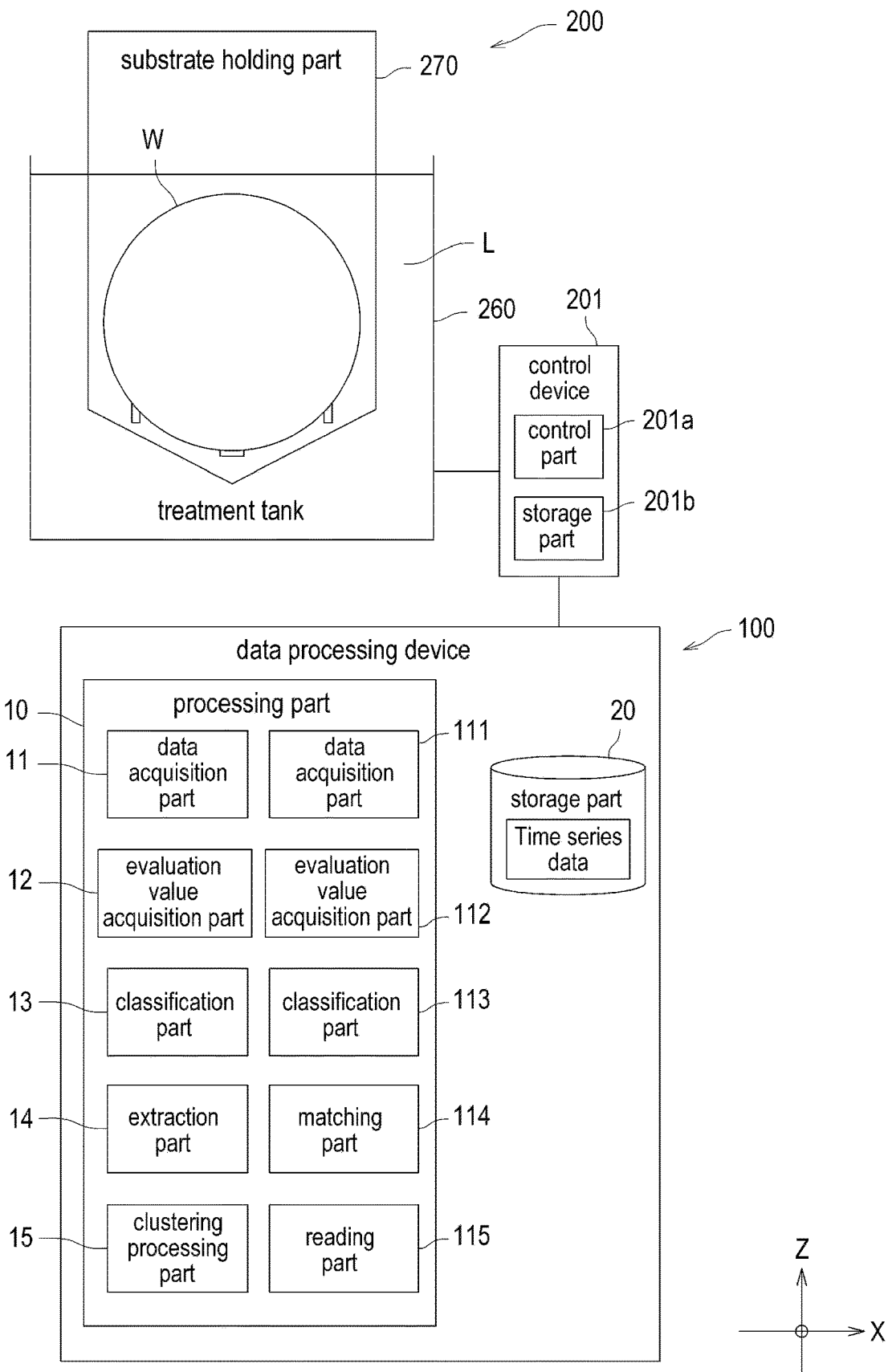
FIG. 24 is a schematic diagram of a data processing device and a substrate processing device according to this embodiment.

A data processing device 100 and a substrate processing device 200 according to this embodiment will be described with reference to FIG. 24. FIG. 24 is a schematic diagram of the data processing device 100 and the substrate processing device 200 according to this embodiment. Here, the substrate processing device 200 is the batch type, and a plurality of substrates W can be processed together.

The substrate processing device 200 includes a treatment tank 260, a substrate holding part 270, and a control device 201. The treatment tank 260 stores a processing liquid L for processing the substrate W.

The substrate holding part 270 holds the substrate W. A normal direction of the principal face of the substrate W held by the substrate holding part 270 is parallel to a direction Y. The substrate holding part 270 moves the substrate W with the substrate W held. For example, the substrate holding part 270 moves vertically upward or vertically downward along the vertical direction with the substrate W held.

Typically, the substrate holding part 270 holds a plurality of substrates W together. Here, the plurality of substrates W are arranged in one row along the direction Y. The substrate holding part 270 may hold only one substrate W.

Although the data processing device 100 illustrated in FIGS. 1 to 24 processes time series data generated by one substrate processing device 200, this embodiment is not limited thereto. The data processing device 100 may process time series data generated by the substrate processing device 200 disposed at a different place.

Figure 25:
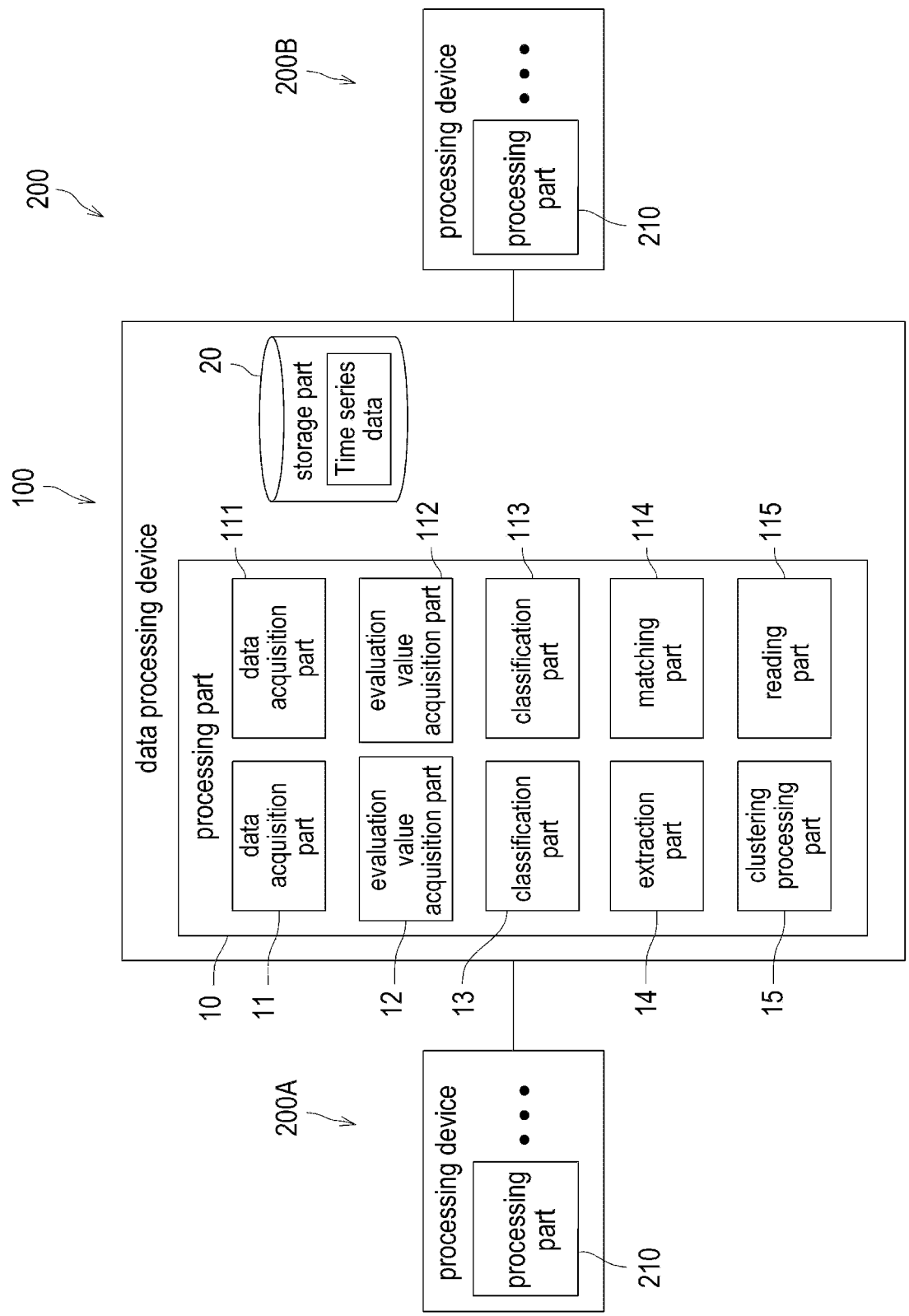
FIG. 25 is a schematic diagram of a data processing device and a substrate processing device according to this embodiment.

Next, a data processing device 100 and a substrate processing device 200 according to this embodiment will be described with reference to FIG. 25. FIG. 25 is a schematic diagram of the data processing device 100 and the substrate processing device 200 according to this embodiment. As illustrated in FIG. 25, the substrate processing device 200 includes a substrate processing device 200A and a substrate processing device 200B. The substrate processing device 200A and the substrate processing device 200B are communicatively connected to the data processing device 100.

Typically, the substrate processing device 200A and the substrate processing device 200B are disposed at places disposed away from each other. For example, the substrate processing device 200A and the substrate processing device 200B may be disposed at different places in the same country. Alternatively, the substrate processing device 200A and the substrate processing device 200B may be disposed at different countries.

The data processing device 100, for example, is a server. For example, the substrate processing device 200A can communicate with the substrate processing device 200B for information through the data processing device 100.

In the description presented above with reference to FIG. 25, although the data processing device 100 can communicate with the substrate processing devices 200A and 200B, the substrate processing device 200A and the substrate processing device 200B may not be present at the same time.

According to the present disclosure, there is provided a data processing method including: acquiring time series data; acquiring evaluation values; performing classification; and performing extraction. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of extraction, the time series data corresponding to one of the plurality of classifications is extracted as extracted time series data.

In a certain embodiment, in the acquiring of the evaluation values, the evaluation values of the plurality of time series data are acquired through comparison between the plurality of time series data and reference data.

In a certain embodiment, in the acquiring of the evaluation values, the evaluation value in a case in which a difference between values of the time series data and the reference data is large is larger than the evaluation value in a case in which a difference between values of the time series data and the reference data is small.

In a certain embodiment, the data processing method described above further includes displaying an evaluation value graph representing changes of the evaluation value of the extracted time series data and the extracted time series data in a switchable manner.

In a certain embodiment, the data processing method described above further includes storing the extracted time series data.

In a certain embodiment, the data processing method described above further includes classifying the extracted time series data into one of a plurality of clusters through clustering processing.

In a certain embodiment, the data processing method described above further includes displaying an evaluation value graph representing the evaluation value of the extracted time series data classified into one of the plurality of clusters and the extracted time series data in a switchable manner.

In a certain embodiment, the data processing method described above further includes generating a learning database in which cause and countermeasure information for the substrate processing device that corresponds to the time series data is assigned to a cluster corresponding to the extracted time series data.

According to the present disclosure, there is provided a data processing method including: acquiring time series data; acquiring evaluation values; performing classification; and performing matching. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of matching, target time series data corresponding to one of the plurality of classifications and time series data included in a learning database are matched with each other.

In a certain embodiment, cause and countermeasure information corresponding to the time series data is stored in the learning database. The data processing method described above in the matching of the target time series data, further including: reading the cause and countermeasure information corresponding to the time series data is further included in a case in which a matching rate between the target time series data and at least one piece of the time series data included in the learning database is higher than a threshold.

In a certain embodiment, in the acquiring of the evaluation values, the evaluation values of the plurality of time series data are acquired through comparison between the plurality of time series data and reference data.

In a certain embodiment, in the acquiring of the evaluation values, the evaluation value in a case in which a difference between values of the time series data and the reference data is large is larger than the evaluation value in a case in which a difference between values of the time series data and the reference data is small.

In a certain embodiment, the data processing method described above further includes storing the target time series data.

According to the present disclosure, there is provided a data processing device including a data acquisition part, an evaluation value acquisition part, a classification part, and an extraction part. The data acquisition part described above is configured to acquire a plurality of time series data acquired by a substrate processing device. The evaluation value acquisition part described above is configured to acquire evaluation values of the plurality of time series data. The classification part described above is configured to classify each of the plurality of time series data into one of a plurality of classifications based on the evaluation value. The extraction part described above is configured to extract the time series data corresponding to one of the plurality of classifications as extracted time series data.

According to the present disclosure, there is provided a data processing device including a data acquisition part, an evaluation value acquisition part, a classification part, and a matching part. The data acquisition part described above is configured to acquire a plurality of time series data acquired by a substrate processing device. The evaluation value acquisition part described above is configured to acquire evaluation values of the plurality of time series data. The classification part described above is configured to classify each of the plurality of time series data into one of a plurality of classifications based on the evaluation value. The matching part described above is configured to match target time series data corresponding to one of the plurality of classifications and time series data included in a learning database.

According to the present disclosure, there is provided a non-transitory computer-readable storage medium storing a program causing a computer to execute: acquiring time series data; acquiring evaluation values; performing classification; and performing extraction. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of extraction, the time series data corresponding to one of the plurality of classifications is extracted as extracted time series data.

According to the present disclosure, there is provided a non-transitory computer-readable storage medium storing a program causing a computer to execute: acquiring time series data; acquiring evaluation values; performing classification; and performing matching. In the acquiring of the time series data, a plurality of time series data acquired by a substrate processing device are acquired. In the acquiring of the evaluation values, the evaluation values of the plurality of time series data are acquired. In the performing of classification, each of the plurality of time series data is classified into one of a plurality of classifications based on the evaluation value. In the performing of matching, target time series data corresponding to one of the plurality of classifications and time series data included in a learning database are matched with each other.

As above, the embodiments of the present disclosure have been described with reference to the drawings. However, the present disclosure is not limited to the embodiments described above and can be performed in various forms in a range not departing from the concept thereof. In addition, a plurality of constituent elements disclosed in the embodiments described above may be appropriately combined. For example, several constituent elements may be removed from all the constituent elements illustrated in the embodiment. Furthermore, constituent elements over different embodiments may be combined as is appropriate. In the drawings, each constituent element is schematically illustrated as a subject for easy understanding, and a thickness, a length, the number, an interval, and the like of each constituent element illustrated in the drawings may be different from those of an actual case due to situations of generation of the drawings. In addition, a material, a shape, a dimension, and the like of each constituent element illustrated in the embodiments described above are examples and not particularly limited, and various changes can be made in a range not substantially departing from the effects of the present disclosure.

What is claimed is:

1. A data processing method comprising:
processing a substrate using a substrate processing device;
acquiring a plurality of time series data acquired by the substrate processing device;
acquiring evaluation values of the plurality of time series data;
classifying each of the plurality of time series data into one of a plurality of classifications based on a corresponding one of the evaluation values;
extracting, as extracted time series data, time series data corresponding to a particular classification of the plurality of classifications and representing an abnormal evaluation value based on a result obtained in the classifying, except time series data corresponding to any of the rest of the plurality of classifications other than the particular classification; and
classifying the extracted time series data of the plurality of time series data into one of a plurality of clusters through clustering processing,
wherein the substrate is a semiconductor wafer having a disc shape,
in the acquiring of the evaluation values, the evaluation values of the plurality of time series data are acquired through comparison between the plurality of time series data and reference data.

2. A data processing method comprising:
processing a substrate using a substrate processing device;
acquiring a plurality of time series data acquired by the substrate processing device;

acquiring evaluation values of the plurality of time series data;

classifying each of the plurality of time series data into one of a plurality of classifications based on a corresponding one of the evaluation values;

extracting based on a result obtained in the classifying time series data corresponding to one of the plurality of classifications and representing an abnormal evaluation value as extracted time series data; and classifying the extracted time series data into one of a plurality of clusters through clustering processing, wherein the substrate is a semiconductor wafer having a disc shape, wherein in the acquiring of the evaluation values, the evaluation values of the plurality of time series data are acquired through comparison between the plurality of time series data and reference data, and wherein, in the acquiring of the evaluation values, an evaluation value of the evaluation values in a first case is larger than an evaluation value of the evaluation values in a second case, a difference between values of the time series data and the reference data in the first case being larger than a difference between values of the time series data and the reference data in the second case.

3. A data processing method comprising:
processing a substrate using a substrate processing device;
acquiring a plurality of time series data acquired by the substrate processing device;
acquiring evaluation values of the plurality of time series data;
classifying each of the plurality of time series data into one of a plurality of classifications based on a corresponding one of the evaluation values;
extracting based on a result obtained in the classifying time series data corresponding to one of the plurality of classifications and representing an abnormal evaluation value as extracted time series data;
classifying the extracted time series data into one of a plurality of clusters through clustering processing; and
displaying the extracted time series data and an evaluation value graph representing changes of the evaluation value of the extracted time series data in a switchable manner,
wherein the substrate is a semiconductor wafer having a disc shape, and
wherein the extracted time series data displayed in the displaying corresponds to an evaluation value designated by a cursor.

4. A data processing method comprising:
processing a substrate using a substrate processing device;
acquiring a plurality of time series data acquired by the substrate processing device;
acquiring evaluation values of the plurality of time series data;
classifying each of the plurality of time series data into one of a plurality of classifications based on a corresponding one of the evaluation values;
extracting based on a result obtained in the classifying time series data corresponding to one of the plurality of classifications and representing an abnormal evaluation value as extracted time series data;
classifying the extracted time series data into one of a plurality of clusters through clustering processing; and
displaying the extracted time series data and an evaluation value graph representing the evaluation value of the extracted time series data classified into one of the plurality of clusters in a switchable manner,
wherein the substrate is a semiconductor wafer having a disc shape, and
wherein the extracted time series data displayed in the displaying corresponds to an evaluation value designated by a cursor.

5. A data processing method comprising:
processing a substrate using a substrate processing device;
acquiring a plurality of time series data acquired by the substrate processing device;
acquiring evaluation values of the plurality of time series data;
classifying each of the plurality of time series data into one of a plurality of classifications based on a corresponding one of the evaluation values;
extracting based on a result obtained in the classifying time series data corresponding to one of the plurality of classifications and representing an abnormal evaluation value as extracted time series data;
classifying the extracted time series data into one of a plurality of clusters through clustering processing;
displaying the extracted time series data and an evaluation value graph representing changes of the evaluation value of the extracted time series data in a switchable manner; and
generating a learning database in which cause and countermeasure information for the substrate processing device that corresponds to the time series data is assigned to a cluster corresponding to the extracted time series data,
wherein the substrate is a semiconductor wafer having a disc shape.

6. A data processing method comprising:
processing a substrate using a substrate processing device;
acquiring a plurality of time series data acquired by the substrate processing device;
acquiring evaluation values of the plurality of time series data;
classifying each of the plurality of time series data into one of a plurality of classifications based on a corresponding one of the evaluation values; and
matching target time series data that has been classified into a particular classification of the plurality of classifications in the classifying and that represents an abnormal evaluation value and time series data included in a learning database and classified into a plurality of clusters in the particular classification of the plurality of classifications, except time series data corresponding to any of the rest of the plurality of classifications other than the particular classification,
wherein the substrate is a semiconductor wafer having a disc shape.

7. The data processing method according to claim 6, wherein, in the acquiring of the evaluation values, the evaluation values of the plurality of time series data are acquired through comparison between the plurality of time series data and reference data.

8. The data processing method according to claim 6, further comprising storing the target time series data.

9. A data processing method comprising:
processing a substrate using a substrate processing device;
acquiring a plurality of time series data acquired by the substrate processing device;
acquiring evaluation values of the plurality of time series data;

classifying each of the plurality of time series data into one of a plurality of classifications based on a corresponding one of the evaluation values; and matching target time series data that has been classified into one of the plurality of classifications in the classifying and that represents an abnormal evaluation value and time series data included in a learning database and classified into a plurality of clusters in the one of the plurality of classifications, wherein the substrate is a semiconductor wafer having a disc shape, wherein cause and countermeasure information corresponding to the time series data is stored in the learning database, and wherein, in the matching of the target time series data, reading the cause and countermeasure information corresponding to the time series data is further included in a case in which a matching rate between the target time series data and at least one piece of the time series data included in the learning database is higher than a threshold.

10. A data processing method comprising:

processing a substrate using a substrate processing device;

acquiring a plurality of time series data acquired by the substrate processing device;

acquiring evaluation values of the plurality of time series data;

classifying each of the plurality of time series data into one of a plurality of classifications based on a corresponding one of the evaluation values; and matching target time series data that has been classified into one of the plurality of classifications in the classifying and that represents an abnormal evaluation value and time series data included in a learning database and classified into a plurality of clusters in the one of the plurality of classifications, wherein the substrate is a semiconductor wafer having a disc shape, wherein in the acquiring of the evaluation values, the evaluation values of the plurality of time series data are acquired through comparison between the plurality of time series data and reference data, and wherein, in the acquiring of the evaluation values, the evaluation value of the evaluation values in a first case is larger than the evaluation value of the evaluation values in a second case, a difference between values of the time series data and the reference data in the first case is larger than a difference between values of the time series data and the reference data in the second case.

* * * * *